US009979439B2

(12) United States Patent
Kwon et al.

(10) Patent No.: US 9,979,439 B2
(45) Date of Patent: May 22, 2018

(54) WIRELESS POWER TRANSMITTER AND RECEIVER, AND METHOD FOR TRANSMITTING EMERGENCY INFORMATION IN A WIRELESS CHARGING NETWORK

(71) Applicant: Samsung Electronics Co., Ltd., Gyeonggi-do (KR)

(72) Inventors: Hyuk-Choon Kwon, Seoul (KR); Kyung-Woo Lee, Seoul (KR); Kang-Ho Byun, Gyeonggi-do (KR); Hee-Won Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 583 days.

(21) Appl. No.: 14/058,916

(22) Filed: Oct. 21, 2013

(65) Prior Publication Data

US 2014/0111018 A1    Apr. 24, 2014

(30) Foreign Application Priority Data

Oct. 19, 2012  (KR) .................. 10-2012-0116528
Oct. 24, 2012  (KR) .................. 10-2012-0118538
May 3, 2013    (KR) .................. 10-2013-0050309

(51) Int. Cl.
| | |
|---|---|
| *H01F 38/00* | (2006.01) |
| *H04B 5/00* | (2006.01) |
| *H02J 50/40* | (2016.01) |
| *H02J 50/12* | (2016.01) |
| *H02J 50/80* | (2016.01) |

(Continued)

(52) U.S. Cl.
CPC ............ *H04B 5/0037* (2013.01); *H02J 5/005* (2013.01); *H02J 7/02* (2013.01); *H02J 7/025* (2013.01); *H02J 50/10* (2016.02); *H02J 50/12* (2016.02); *H02J 50/40* (2016.02); *H02J 50/60* (2016.02); *H02J 50/80* (2016.02); *H04B 5/0081* (2013.01);
(Continued)

(58) Field of Classification Search
CPC .................................. H02J 7/027; H02J 7/025
USPC ........................................................ 307/104
See application file for complete search history.

(56) References Cited

U.S. PATENT DOCUMENTS

| | | | | |
|---|---|---|---|---|
| 8,729,852 B2 * | 5/2014 | Tsai | ...................... | H01M 10/46 |
| | | | | 307/104 |
| 2004/0239525 A1 * | 12/2004 | Kobayashi | ............. | G08B 13/00 |
| | | | | 340/870.16 |

(Continued)

FOREIGN PATENT DOCUMENTS

| | | |
|---|---|---|
| JP | 2012-044735 | 3/2012 |
| KR | 1020110034773 | 4/2011 |

OTHER PUBLICATIONS

European Search Report dated Mar. 2, 2016 issued in counterpart application No. 13847472.1-1874, 8 pages.

(Continued)

*Primary Examiner* — Alfonso Perez Borroto
(74) *Attorney, Agent, or Firm* — The Farrell Law Firm, P.C.

(57) ABSTRACT

An apparatus and a method are provided for efficiently transmitting emergency information in a wireless charging network. The method includes receiving wireless charging power from a wireless power transmitter; detecting an occurrence of an emergency situation; generating an emergency signal including information of the emergency situation; and transmitting the generated emergency signal to the wireless power transmitter.

18 Claims, 18 Drawing Sheets

(51) Int. Cl.
*H02J 50/60* (2016.01)
*H02J 7/02* (2016.01)
*H02J 50/10* (2016.01)
*H02J 5/00* (2016.01)
*H02J 7/04* (2006.01)

(52) U.S. Cl.
CPC .............. *H02J 7/045* (2013.01); *H02J 7/047* (2013.01); *H04B 5/0031* (2013.01)

(56) References Cited

U.S. PATENT DOCUMENTS

| | | | |
|---|---|---|---|
| 2006/0062250 A1* | 3/2006 | Payne, III | H04L 12/2602 370/468 |
| 2006/0113955 A1* | 6/2006 | Nunally | H02J 7/025 320/108 |
| 2007/0109121 A1 | 5/2007 | Cohen | |
| 2009/0121835 A1 | 5/2009 | Borret et al. | |
| 2010/0039071 A1* | 2/2010 | Hansford | H01M 2/1055 320/162 |
| 2010/0060232 A1* | 3/2010 | Boyles | H02J 7/0027 320/107 |
| 2010/0184382 A1* | 7/2010 | Inha | H02J 7/0052 455/66.1 |
| 2010/0194335 A1 | 8/2010 | Kirby et al. | |
| 2011/0074344 A1 | 3/2011 | Park et al. | |
| 2011/0080283 A1* | 4/2011 | Schweitzer, III | G01R 31/085 340/539.26 |
| 2011/0225073 A1 | 9/2011 | Won et al. | |
| 2012/0038317 A1* | 2/2012 | Miyamoto | H02J 7/025 320/108 |
| 2012/0242163 A1 | 9/2012 | Jung et al. | |
| 2012/0306286 A1* | 12/2012 | Kim | B60L 11/182 307/104 |

OTHER PUBLICATIONS

Chinese Office Action dated Jul. 10, 2017 issued in counterpart application No. 201380062490.1, 18 pages.

* cited by examiner

WIRELESS POWER TRANSMITTER AND RECEIVER, AND METHOD FOR TRANSMITTING EMERGENCY INFORMATION IN A WIRELESS CHARGING NETWORK

PRIORITY

This application claims priority under 35 U.S.C. § 119(a) to Korean Application Serial Nos. 10-2012-0116528, 10-2012-0118538, and 10-2013-0050309, which were filed in the Korean Intellectual Property Office on Oct. 19, 2012, Oct. 24, 2012, and May 3, 2013, the entire content of each of which is hereby incorporated by reference.

BACKGROUND OF THE INVENTION

1. Field of the Invention

The present invention relates generally to an apparatus and a method for efficiently transmitting emergency information in a wireless charging network, and more particularly, to a wireless power transmitter, a wireless power receiver, and a method for transmitting emergency information in a wireless charging network.

2. Description of the Related Art

Wireless charging techniques use wireless power transmission and reception to automatically charge a battery of an electronic device, e.g., a mobile phone, when the electronic device is located within a predetermined distance of a charging device, e.g., put on a charging pad, without physically connecting the electronic device to a conventional charger.

The wireless charging techniques are broadly categorized into an electromagnetic induction type using coils, a resonance type using a resonance phenomenon, and a Radio Frequency (RF)/Microwave radiation type, which converts electrical energy into microwaves for transmission.

The electromagnetic induction technique transmits power between a primary coil and a secondary coil. More specifically, when moving a magnet around a coil, a current is induced and electricity is generated. That is, a transmission end generates a magnetic field and a reception end generates energy on behalf of the magnet, which is commonly referred to as an electromagnetic induction phenomenon.

The resonance technique wirelessly transmits power using a resonance-type power transmission principle over greater distances than the electromagnetic induction technique. Basically, electromagnetic waves are resonated containing electric energy, which is directly transferred only to a device having a matching resonance frequency, and any unused portion is reabsorbed into an electromagnetic field instead of spreading in the air.

Although various studies have been performed on the wireless charging techniques, when emergency situations occur in the wireless power receiver (or Power Reception Unit (PRU)), such as an over voltage, an over current, an over temperature, or a system error, the wireless power receiver should transmit emergency situation information to the wireless power transmitter (or Power Transmission Unit (PTU)). However, in conventional signal transmission protocols, no method has been proposed for the wireless power receiver to transmit the emergency situation information to the wireless power transmitter.

SUMMARY OF THE INVENTION

Accordingly, the present invention is designed to address at least the problems and/or disadvantages described above and to provide at least the advantages described below.

An aspect of the present invention is to provide a wireless power transmitter, a wireless power receiver, and a method for transmitting emergency information transmission in a wireless charging network, wherein when an emergency situation occurs in the wireless power receiver of the wireless charging network, the emergency information is transmitted separately from a general message exchanging procedure between the wireless power receiver and the wireless power transmitter.

In accordance with an aspect of the present invention, a method for transmitting emergency information by a wireless power receiver, which receives wireless power from a wireless power transmitter, is provided. The method includes receiving a wireless charging power from a wireless power transmitter; determining whether or not an emergency situation occurs; when it is determined that the emergency situation having occurred, generating an emergency signal through information of the emergency situation; and transmitting the generated emergency signal to the wireless power transmitter.

In accordance with another aspect of the present invention, a method for emergency information processing of wireless power transmitter that transmits a wireless charging power to a wireless power receiver is provided. The method includes receiving emergency information from the wireless power receiver; stopping transmission of a wireless power supplied to at least one of wireless power receiver according to the received emergency information; and transferring the emergency information to at least one of wireless power receiver included in a wireless charging network of the wireless power transmitter.

In accordance with another aspect of the present invention, a wireless power receiver that receives a wireless charging power from a wireless power transmitter is provided. The wireless power receiver includes a power reception unit that receives the wireless charging power from the wireless power transmitter; a controller that determines whether or not an emergency situation occurs, and generates an emergency signal based on information of the emergency situation when it is determined that the emergency situation has occurred; and a communication unit that transmits the generated emergency signal to the wireless power transmitter.

In accordance with another aspect of the present invention, a wireless power transmitter that transmits a wireless charging power to a wireless power receiver is provided. The wireless power transmitter includes a power transmission unit that transmits the charging power to the wireless power receiver; a communication unit that receives emergency information from the wireless power receiver; and a controller that stops transmission of a wireless power supplied to at least one of wireless power receiver according to the received emergency information, and transfers the emergency information to at least one wireless power receiver included in a wireless charging network of the wireless power transmitter.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
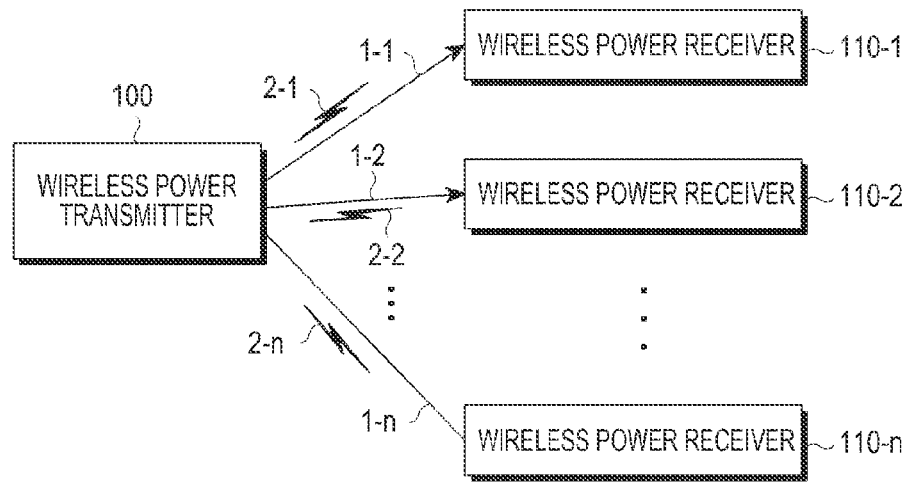
FIG. 1 is a block diagram illustrating a wireless charging system according to an embodiment of the present invention.

FIG. 1 is a block illustrating a wireless charging system according to an embodiment of the present invention.

Referring to FIG. 1, the wireless charging system includes a wireless power transmitter 100, and wireless power receivers 110-1, 110-2, . . . , 110-n. For example, the wireless power receivers 110-1, 110-2, . . . , 110-n may be realized as mobile communication terminals, Personal Digital Assistants (PDAs), Portable Multimedia Players (PDPs), smart phones, etc.

The wireless power transmitter 100 wirelessly transmit powers 1-1, 1-2, . . . , 1-n, e.g., in the form of electromagnetic waves, to the wireless power receivers 110-1, 110-2, . . . , 110-n, respectively. More specifically, the wireless power transmitter 100 wirelessly transmits the powers 1-1, 1-2, . . . , 1-n to authenticated wireless power receivers having undergone a predetermined authentication procedure.

The wireless power transmitter 100 performs two-way communication with the wireless power receivers 110-1, 110-2, . . . , 110-n. Here, the wireless power transmitter 100 and the wireless power receivers 110-1, 110-2, . . . , 110-n process or transmit/receive packets 2-1, 2-2, . . . , 2-n including frames.

When a resonance type wireless charging technology is used by the wireless power transmitter 100, distances between the wireless power transmitter 100 and the wireless power receivers 110-1, 110-2, . . . , 110-n are approximately 30 mm or less. Further, when an electromagnetic induction type wireless charging technology is used by the wireless power transmitter 100, distances between the wireless power transmitter 100 and the wireless power receivers 110-1, 110-2, . . . , 110-n are approximately 10 cm or less.

The wireless power receivers 110-1, 110-2, . . . , 110-n wirelessly receive power from the wireless power transmitter 100 to charge batteries therein. Additionally, the wireless power receivers 110-1, 110-2, . . . , 110-n may transmit signals requesting wireless power transmission, information for wireless power reception, state information of the wireless power receivers, and control information for the wireless power transmitter 100 to the wireless power transmitter 100. Further, the wireless power receivers 110-1, 110-2, . . . , 110-n may send messages indicating respective charging states thereof to the wireless power transmitter 100.

The wireless power transmitter 100 may include a display that displays the states of the wireless power receivers 110-1, 110-2, . . . , 110-n, based on the messages received from the wireless power receivers 110-1, 110-2, . . . , 110-n. In addition, the wireless power transmitter 100 may display expected times until the wireless power receivers 110-1, 110-2, . . . , 110-n are completely charged.

The wireless power transmitter 100 may also transmit control signals to the wireless power receivers 110-1, 110-2, ..., 110-n, disabling their wireless charging functions. The wireless power receivers 110-1, 110-2, ..., 110-n having received the control signals for disabling the wireless charging functions from the wireless power transmitter 100 disable their wireless charging functions.

Figure 2:
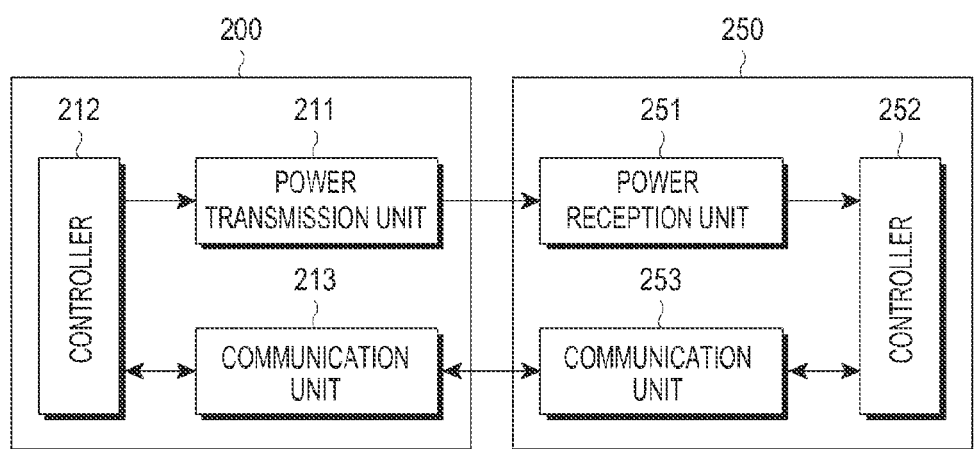
FIG. 2 is a block diagram illustrating a wireless power transmitter and a wireless power receiver according to an embodiment of the present invention.

FIG. 2 is a block diagram illustrating a wireless power transmitter and a wireless power receiver according to an embodiment of the present invention.

Referring to FIG. 2, the wireless power transmitter 200 includes a power transmission unit 211, a controller 212, and a communication unit 213, and the wireless power receiver 250 includes a power reception unit 251, a controller 252, and a communication unit 253.

The power transmission unit 211 supplies power to the wireless power transmitter 200, and wirelessly supplies power to the wireless power receiver 250. The power transmission unit 211 may supply power in an Alternating Current (AC) waveform directly to the wireless power receiver 250, or supply the power in a Direct Current (DC) waveform through an inverter, which converts the DC power into AC power to be supplied to the wireless power receiver 250. The power transmission unit 211 may be realized as a battery or as a power reception interface that receives power from an outside source, e.g., an outlet. Basically, the power transmission unit 211 may be any device capable of wirelessly supplying power.

In addition, the power transmission unit 211 may supply the AC power in the form of an electromagnetic wave to the wireless power receiver 250. The power transmission unit 211 may additionally include a resonance circuit (not shown), and thus, may transmit and receive an electromagnetic wave. When the power transmission unit 211 includes a resonance circuit, an inductance L of a loop coil of the resonance circuit may vary.

The controller 212 controls the overall operation of the wireless power transmitter 200, e.g., through an algorithm, a program, or an application used by the controller 212, read from a storage unit (not shown). For example, the controller 212 may be a Central Processing Unit (CPU), a microprocessor, or a mini computer.

The communication unit 213 performs communication with the wireless power receiver 250 through a predetermined method, e.g., using Near Field Communication (NFC), Zigbee communication, infrared-ray communication, visible light communication, Bluetooth communication, or Bluetooth Low Energy (BLE). The communication unit 213 may also use a Carrier Sense Multiple Access with Collision Avoidance (CSMA/CA) algorithm.

The communication unit 213 transmits a signal for information of the wireless power transmitter 200, e.g., by unicasting, multicasting, or broadcasting the signal.

Table 1 shows an example of a data structure of a signal transmitted from the wireless power transmitter 200 according to an embodiment of the present invention. The wireless power transmitter 200 may transmit the signal at periodic intervals. Herein, the signal may also be referred to as a notice signal.

TABLE 1

| Frame Type | Protocol Version | Sequence Number | Network ID | Rx to Report (or Schedule mask) | Reserved | Number of Rx |
|---|---|---|---|---|---|---|
| Notice | 4 bit | 1 Byte | 1 Byte | 1 Byte | 5 bit | 3 bit |

In Table 1, the Frame Type field indicates the type of signal, i.e., a notice signal. The Protocol Version field indicates a protocol type of the communication, and in this example, is allotted 4 bits. The Sequence Number filed indicates a sequential order of the corresponding signal, and in this example, is allotted 1 Byte. For example, the sequence number may increase by 1 in correspondence to transmission/reception steps of the signal.

The Network IDentifier (ID) field indicates a network ID of the wireless power transmitter 200, and in this example, is allotted 1 Byte. The Receiver (Rx) to Report (or Schedule mask) field indicates the wireless power receivers that will report to the wireless power transmitter 200, and in this example, is allotted 1 Byte.

Table 2 shows an example of an Rx to Report (or Schedule mask) field according to an embodiment of the present invention.

TABLE 2

| Rx to Report (Schedule mask) | | | | | | | |
|---|---|---|---|---|---|---|---|
| Rx1 | Rx2 | Rx3 | Rx4 | Rx5 | Rx6 | Rx7 | Rx8 |
| 1 | 0 | 0 | 0 | 0 | 1 | 1 | 1 |

In Table 2, Rx1 to Rx8 correspond to wireless power receivers 1 to 8, respectively. Here, each wireless power receiver with a "1" in the Rx to Report (or Schedule mask) field is to report, i.e., Rx1, Rx6, Rx7, and Rx8.

The Reserved field is reserved for later use, and in this example, is allotted 5 Bytes. The Number of Rx field indicates the number of the wireless power receivers around the wireless power transmitter 200, and in this example, is allotted 3 bits.

The communication unit 213 receives power information from the wireless power receiver 250. For example, the power information includes at least one of a capacity of the wireless power receiver 250, a residual battery amount, the number of times being charged, a used amount, a battery capacity, and a battery rate.

As indicated above, the communication unit 213 may transmit a charging function control signal for enabling or disabling the charging function of the wireless power reception unit 251 of the specific wireless power receiver 250. Alternatively, the power information which will be described in more detail may also include information such as lead-in of a wired charging terminal, a conversion from a Service Availability (SA) mode to a Non-SA (NSA) mode, and release of an error situation.

The communication unit 213 may also receive a signal from another wireless power transmitter (not shown). For example, the communication unit 213 may receive the notice signal of the frame shown in Table 1 from the other wireless power transmitter.

Additionally, although the power transmission unit 211 and the communication unit 213 are illustrated in FIG. 2 as being different hardware devices, the power transmission unit 211 and the communication unit 213 may be embodied as a single hardware device.

The wireless power transmitter 200 and the wireless power receiver 250 may transmit and receive different types of signals, such that the wireless power receiver 250 may join in a wireless power network managed by the wireless power transmitter 200, and charging may be performed through wireless power transmission/reception.

Figure 3:
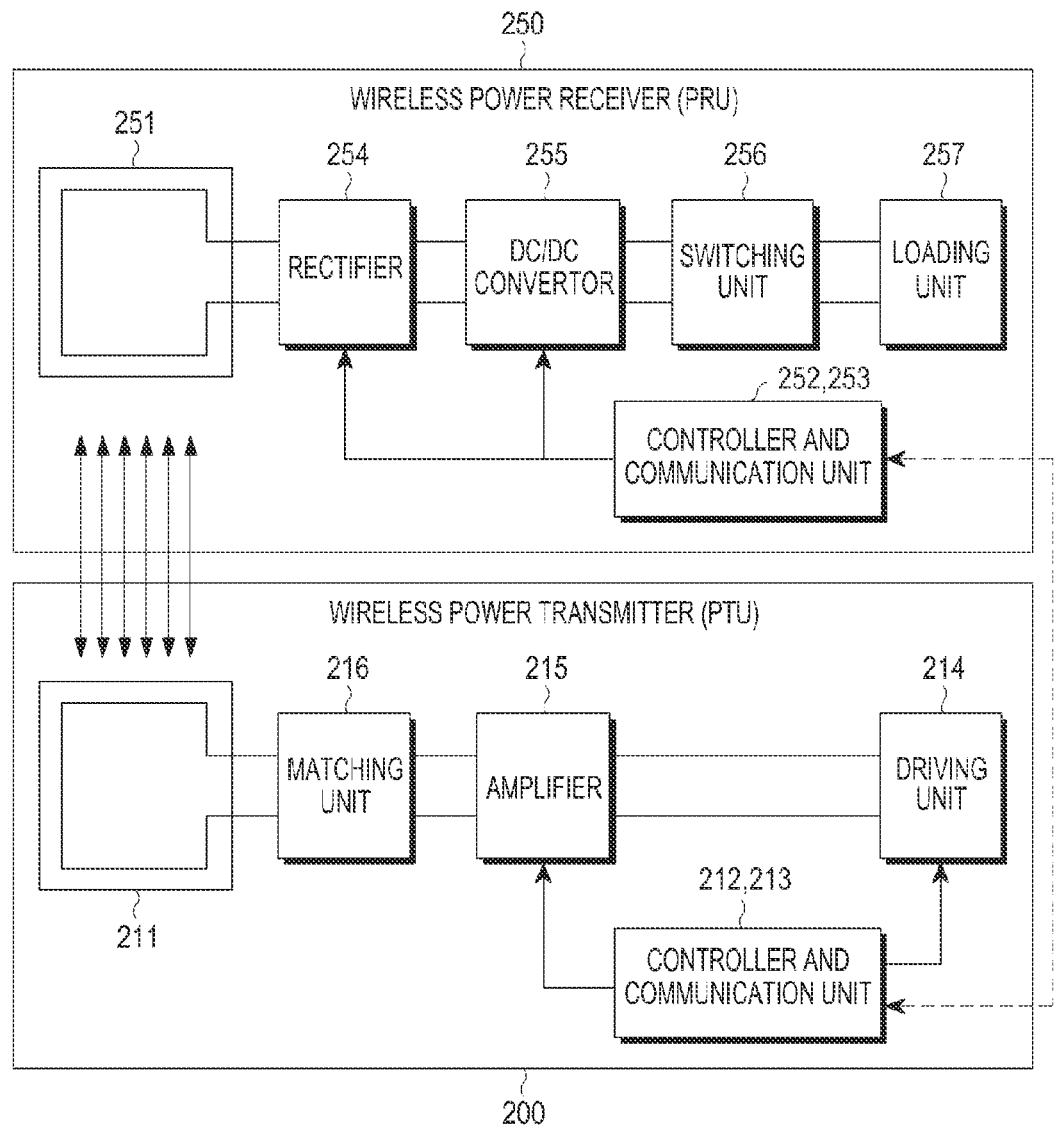
FIG. 3 is a block diagram illustrating a wireless power transmitter and a wireless power receiver according to an embodiment of the present invention.

FIG. 3 is a block diagram illustrating a wireless power transmitter and a wireless power receiver according to an embodiment of the present invention.

Referring to FIG. 3, the wireless power transmitter 200 includes a power transmission unit 211, a controller and a communication unit 212 and 213, a driving unit 214, an amplifier 215, and a matching unit 216. The wireless power receiver 250 includes a power reception unit 251, a controller and a communication unit 252 and 253, a rectifier 254, a DC/DC convertor 255, a switching unit 256, and a loading unit 257.

The driving unit 214 outputs a DC power having a predetermined voltage value. The voltage value of the DC power output from the driving unit 214 is controlled by the controller and the communication unit 212 and 213.

The DC output from the driving unit 214 is output to the amplifier 215. The amplifier 215 amplifies the DC with a predetermined gain. In addition, the amplifier 215 may also convert the DC power into an AC power, based on a signal received from the controller and the communication unit 212 and 213. Accordingly, the amplifier 215 may output the AC power.

The matching unit 216 performs impedance matching. For example, the matching unit 216 adjusts the impedance viewed from the matching unit 216 to control the power output with high efficiency and high power. The matching unit 216 adjusts the impedance under the control of the controller and the communication unit 212 and 213. For example, the matching unit 216 includes at least one of a coil and a capacitor. The controller and the communication unit 212 and 213 control a connection with the at least one of the coil and the capacitor to perform the impedance matching.

The power transmission unit 211 transmits the AC power to the power reception unit 251. The power transmission unit 211 and the power reception unit 251 may be realized through a resonance circuit having the same resonance frequency. For example, the resonance frequency may be 6.78 MHz.

The controller and the communication unit 212 and 213 communicate with the controller and the communication unit 252 and 253 of the wireless power receiver 250, e.g., through a two-way frequency of 2.4 GHz.

The power reception unit 251 receives the AC charging power from the power transmission unit 211.

The rectifier 254, e.g., a bridge diode, rectifies the wireless power received in the power reception unit 251 into DC. The DC/DC convertor 255 converts the rectified power with a predetermined gain. For example, the DC/DC convertor 255 converts the rectified power output 5V. A minimum value and a maximum value of the voltage that may be applied may be set in advance at a front end of the DC/DC convertor 255.

The switching unit 256 connects the DC/DC convertor 255 to the loading unit 257. The switching unit 256 remains in an On or Off state under the control of the controller and communication unit 252 and 253. The loading unit 257 stores the converted power input from the DC/DC convertor 255, when the switching unit 256 remains in the On state.

Figure 4:
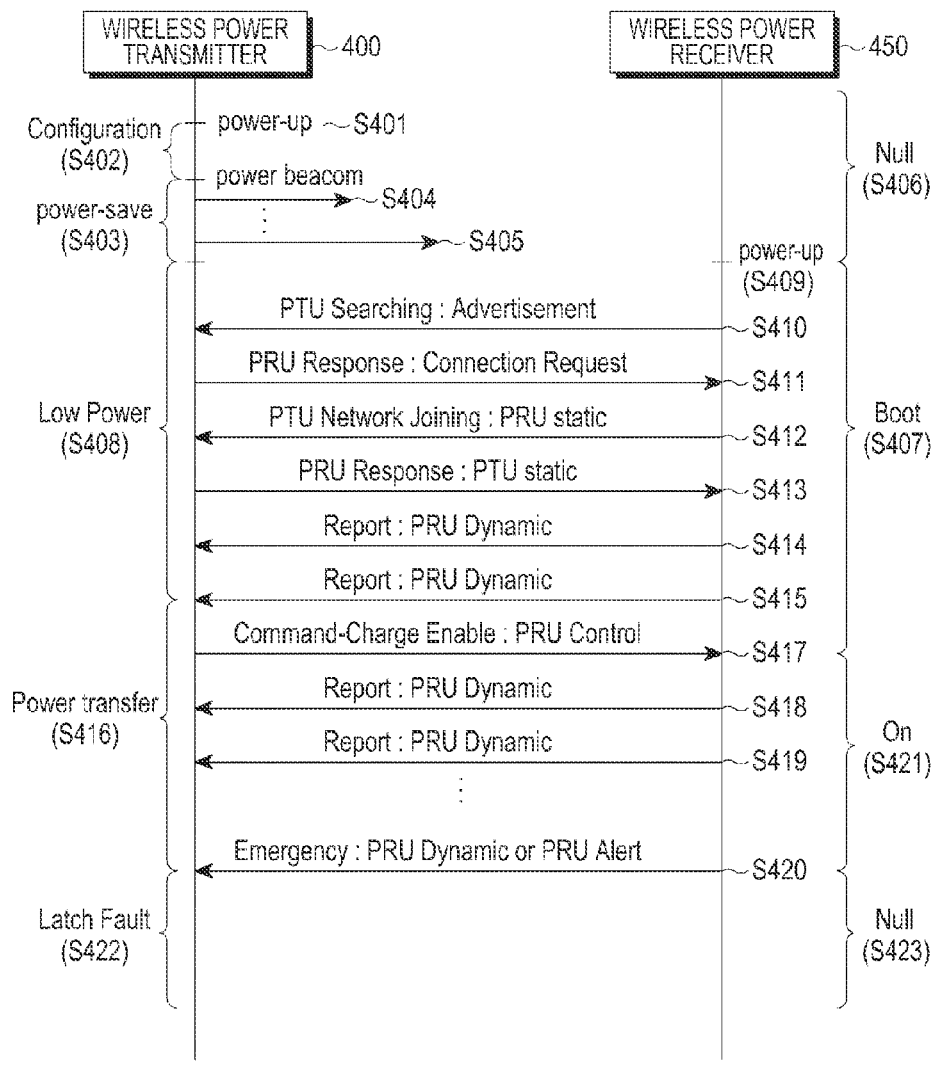
FIG. 4 is a signal flow diagram illustrating operations of a wireless power transmitter and a wireless power receiver according to an embodiment of the present invention.

FIG. 4 is a signal flow diagram illustrating operations of a wireless power transmitter and a wireless power receiver according to an embodiment of the present invention.

Referring to FIG. 4, the wireless power transmitter 400 applies an electric power in step S401. When the electric power is applied, the wireless power transmitter 400 is operating in a configuration mode in step S402.

The wireless power transmitter 400 enters a power save mode in step S403. In the power save mode, the wireless power transmitter 400 may apply different power beacons for detection according to respective periods, which will be described below in more detail with reference to FIG. 6.

The wireless power transmitter 400 applies power beacons for detection 404, . . . , 405, which may have different power values. All or some of the power beacons for detection 404, . . . , 405 may have enough power to drive a communication unit of the wireless power receiver 450. For example, the wireless power receiver 450 may communicate with the wireless power transmitter 400 by driving the communication unit using the power beacons for detection 404, . . . , 405. In step S406, the wireless power receiver is in a Null state.

The wireless power transmitter 400 detects a load change through an arrangement of the wireless power receiver 450, and enters a low power mode in step S408).

In step S409, the wireless power receiver 450 drives the communication unit based on the power having been received from the wireless power transmitter 400.

The wireless power receiver 450 transmits a PTU search signal for searching for a wireless power transmitter in step S410. For example, the wireless power receiver 450 may transmit the PTU search signal through a BLE based advertisement signal. The wireless power receiver 450 may periodically transmit the PTU search signal, until receiving a response signal from the wireless power transmitter 400 or until expiration of a predetermined time.

When receiving the PTU search signal from the wireless power receiver 450, the wireless power transmitter 400 transmits a PRU response signal in step S411. Here, the PRU response signal forms a connection between the wireless power transmitter 400 and the wireless power receiver 450.

In step S412, the wireless power receiver 450 transmits a PRU static signal. For example, the PRU static signal indicates a state of the wireless power receiver 450, and requests joining in a wireless power network managed by the wireless power transmitter 400.

In step S413, the wireless power transmitter 400 transmits a PTU static signal indicating a capacity of the wireless power transmitter 400.

In steps S414 and S415, the wireless power receiver 450 periodically transmits a PRU Dynamic signal including at least one information parameter having been measured in the wireless power receiver 450. For example, the PRU Dynamic signal may include voltage information at a rear end of a rectifier of the wireless power receiver 450. In step S407, the wireless power receiver 450 enters a Boot state.

The wireless power transmitter 400 enters a power transfer mode in S416, and transmits a PRU control signal corresponding to an instruction signal for allowing the wireless power receiver 450 to perform charging in step S417. In the power transmission mode, the wireless power transmitter 400 transmits charging power.

The PRU control signal transmitted by the wireless power transmitter 400 may include information for enabling/disabling charging of the wireless power receiver 450, and permission information. For example, the PRU control signal is transmitted when the wireless power transmitter 400 wants to change the charging state of the wireless power receiver 450, or according to a predetermined period, for example, a period of 250 ms.

The wireless power receiver 450 changes a configuration in response to the PRU control signal, and transmits a PRU Dynamic signal for reporting the state of the wireless power receiver 450 in steps S418 and S419. For example, the PRU Dynamic signal transmitted by the wireless power receiver 450 includes at least one of a voltage, a current, a state of the wireless power receiver, and temperature information. In step S421, the wireless power receiver 450 is in an On state.

An example of a data structure of the PRU Dynamic signal is shown in Table 3.

TABLE 3

| Field | Octets | Description | Use | Units |
|---|---|---|---|---|
| Optional fields | 1 | Defines which optional fields are populated | Mandatory | |
| $V_{rect}$ | 2 | Voltage at diode output | Mandatory | mV |
| $I_{rect}$ | 2 | Current at diode output | Mandatory | mA |
| $V_{out}$ | 2 | Voltage at charge/battery port | Optional | mV |
| $I_{out}$ | 2 | Current at charge/battery port | Optional | mA |
| Temperature | 1 | Temperature of PRU | Optional | Deg C. from −40 C. |
| $V_{rect}$ min dyn | 2 | $V_{rect}$ low limit (dynamic value) | Optional | mV |
| $V_{rect}$ set dyn | 2 | Desired $V_{rect}$ (dynamic value) | Optional | mV |
| $V_{rect}$ high dyn | 2 | $V_{rect}$ high limit (dynamic value) | Optional | mV |
| PRU alert | 1 | Warnings | Mandatory | Bit field |
| Reserved for Future Use (RFU) | 3 | undefined | | |

As shown in Table 3, the PRU Dynamic signal includes selective field information, voltage information at a rear end of a rectifier of a wireless power receiver, current information at a rear end of a rectifier of a wireless power receiver, voltage information at a rear end of a DC/DC convertor of a wireless power receiver, current information at a rear end of a DC/DC convertor of a wireless power receiver, temperature information, minimal voltage value information at a rear end of a rectifier of a wireless power receiver, optimal voltage value information at a rear end of a rectifier of a wireless power receiver, maximal voltage value information at a rear end of a rectifier of a wireless power receiver, and alert information (PRU alert).

An example of a data structure of the alert information (PRU alert) is shown below in Table 4.

TABLE 4

| 7 | 6 | 5 | 4 | 3 | 2 | 1 | 0 |
|---|---|---|---|---|---|---|---|
| Over Voltage | Over Current | Over Temperature | Charge Complete | TA Detect | Transition | Restart Request | RFU |

As shown in Table 4, the alert information (PRU alert) includes an Over Voltage field, an Over Current field, an Over Temperature field, a Charge Complete field, a Travel Adapter (TA) Detect field for wired charging terminal lead-in detection, a Transition field for SA mode/NSA mode transition, and a Restart Request field for a recharging request.

The wireless power receiver 450 performs charging through reception of the PRU control signal. For example, when the wireless power transmitter 400 has enough power to charge the wireless power receiver 450, the wireless power receiver 450 transmits the PRU control signal to enabling charging. For example, the PRU control signal may be transmitted each time the charging state is changed, at specific intervals, e.g., every 250 ms, or when parameters are changed. The PRU control signal may also be transmitted within a predetermined threshold time, for example, 1 second, even if the parameters are not changed.

During charging, the wireless power receiver 450 may detect an error. Thereafter, the wireless power receiver 450 transmits an alert signal to the wireless power transmitter 400 in step S420. The alert signal may be a PRU Dynamic signal or a PRU alert signal.

For example, the wireless power receiver 450 may indicate the error in the PRU alert field of Table 3 or may transmit a single alert signal (for example, a PRU alert signal) indicating the error. When receiving the alert signal, the wireless power transmitter 400 enters a latch fault mode in step S422. The wireless power receiver 450 enters a Null state in step S423.

Figure 5:
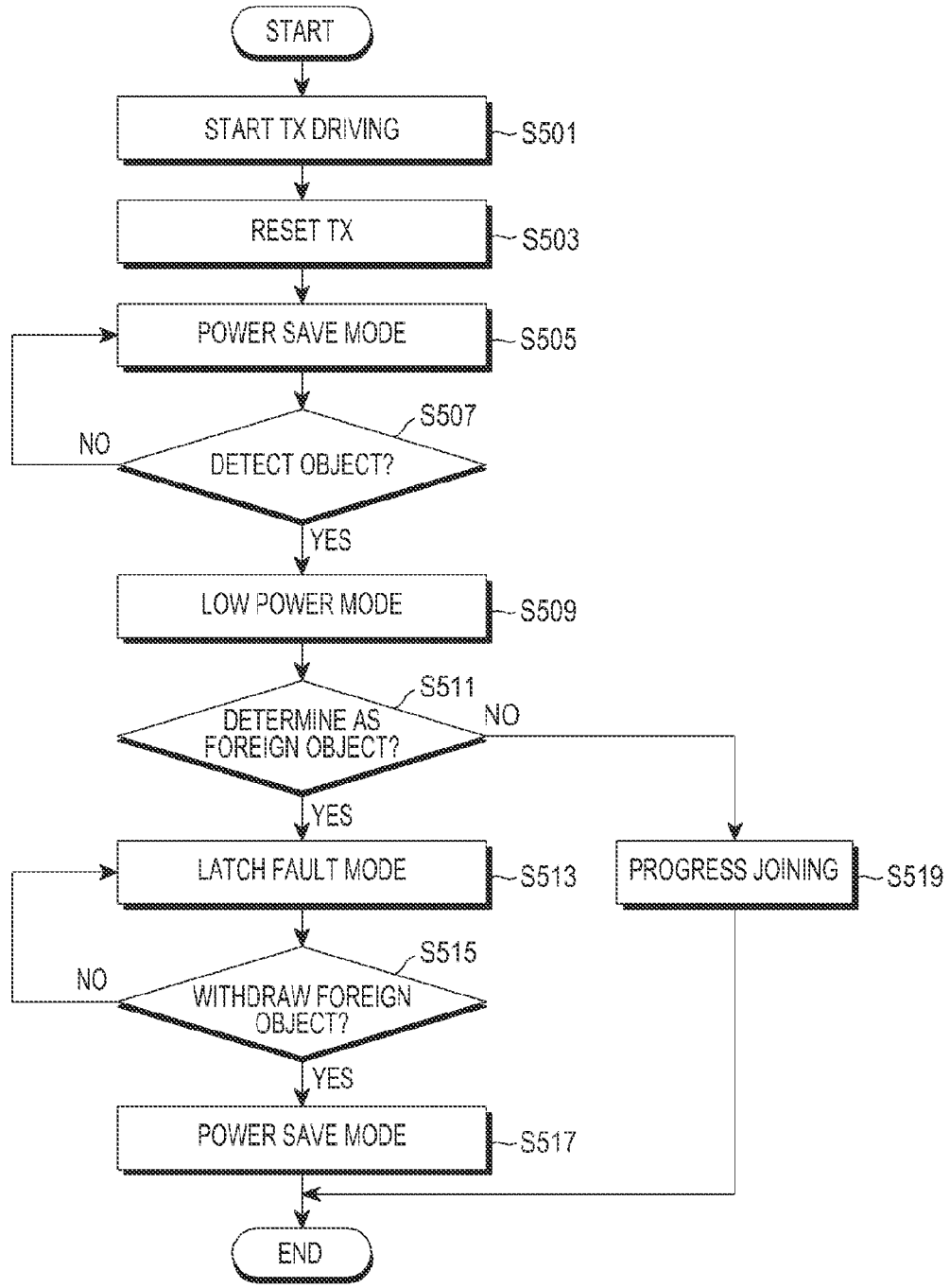
FIG. 5 is a flowchart illustrating operations of a wireless power transmitter and a wireless power receiver according to an embodiment of the present invention.

FIG. 5 is a flowchart illustrating operations of a wireless power transmitter and a wireless power receiver according to an embodiment of the present invention.

Referring to FIG. 5, the wireless power transmitter starts driving in step S501. In step S503, the wireless power transmitter resets an initial configuration. In step S505, the wireless power transmitter enters a power save mode. Herein, the power save mode may correspond to an interval in which the wireless power transmitter applies powers with different power amounts to a power transmission unit.

Figure 6:
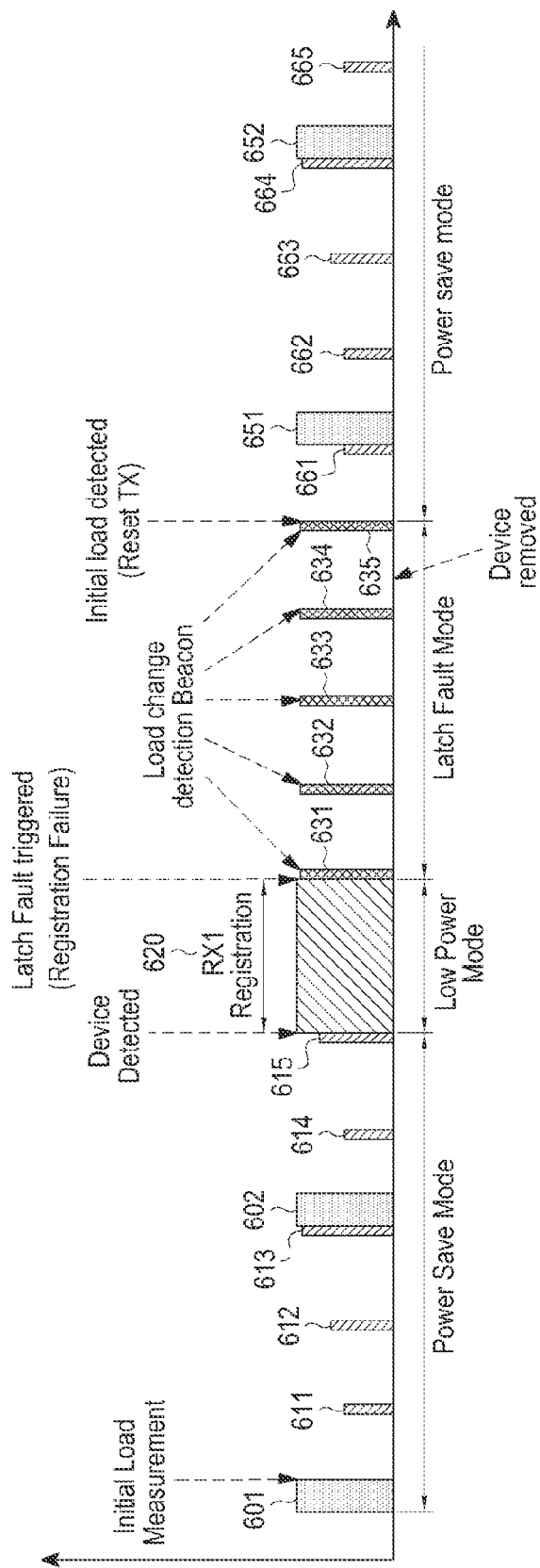
FIG. 6 is a graph illustrating power amounts applied by a wireless power transmitter over time according to an embodiment of the present invention.

FIG. 6 is a graph illustrating power amounts applied by a wireless power transmitter over time according to an embodiment of the present invention.

For example, referring to FIG. 6, the power save mode corresponds to an interval in which the wireless power transmitter applies second detection powers 601 and 602 and third detection powers 611, 612, 613, 614, and 615 to the power transmission unit. The wireless power transmitter may apply the second detection powers 601 and 602 according to a second period, for a second period of time. The wireless power transmitter may apply the third detection powers 611, 612, 613, 614, and 615 according to a third period, for a third period of time. Although the power values of the third detection powers 611, 612, 613, 614, and 615 are different from each other in FIG. 6, the power values of the third detection powers 611, 612, 613, 614, and 615 may also be the same.

For example, the wireless power transmitter may output the third detection power 611, and then may output the third detection power 612 having the same power amount as that of the third detection power 611. As described above, when the wireless power transmitter outputs the third detection powers of the same magnitude, the power amount of the third detection powers may correspond to a power amount capable of detecting the smallest wireless power receiver, for example, a wireless power receiver of category 1.

As another example, the wireless power transmitter may output the third detection power 611, and then may also output the third detection power 612 having a power amount different from that of the third detection power 611. As described above, when the wireless power transmitter outputs the third detection powers of different magnitudes, the power amounts of the third detection powers may correspond to power amounts capable of detecting wireless power receivers of category 1 to 5. For example, the third detection power 611 may correspond to a power amount capable of detecting a wireless power receiver of category 5, the third detection power 612 may correspond to a power amount capable of detecting a wireless power receiver of category 3, and the third detection power 613 may correspond to a power amount capable of detecting a wireless power receiver of category 1.

The second detection powers 601 and 602 may be powers capable of driving the wireless power receiver. More specifically, the second detection powers 601 and 602 may have power amounts capable of driving a controller and a communication unit of the wireless power receiver.

The wireless power transmitter applies the second detection powers 601 and 602, and the third detection powers 611, 612, 613, 614, and 615 to a power reception unit according to a second period and a third period, respectively.

When the wireless power receiver enters a wireless service area of the wireless power transmitter, the impedance as viewed from the wireless power transmitter changes. Accordingly, the wireless power transmitter may detect a change in the impedance while the second detection powers 601 and 602, and the third detection powers 611, 612, 613, 614, and 615 are applied. For example, the wireless power transmitter may detect a change in the impedance while the third detection power 615 is applied.

Referring again to FIG. 5, the wireless power transmitter detects an object in step S507. When an object is not detected in step S507, the wireless power transmitter remains in a power save mode in step S505.

When an object is not detected, e.g., when an impedance change is detected in step S507, the wireless power transmitter enters a low power mode in step S509.

In the low power mode the wireless power transmitter applies a driving power capable of driving the controller and the communication unit of the wireless power receiver. For example, referring again to FIG. 6, the wireless power transmitter applies a driving power 620 to a power transmission unit. The wireless power receiver drives the controller and the communication unit through reception of the driving power 620. The wireless power receiver communicates with the wireless power transmitter using the driving power 620.

For example, the wireless power receiver transmits and receives data for authentication, and joins in a wireless power network, which the wireless power transmitter manages, based on the data. However, when a foreign object, i.e., not a wireless power receiver, is placed within a charging area of the wireless power transmitter, data transmission/reception cannot be performed. Accordingly, the wireless power transmitter determines whether or not a new object placed within a charging area of the wireless power transmitter is a foreign object. For example, if a response is not received from an object for a predetermined period of time, the wireless power transmitter may determine the new object is a foreign object.

Referring again to FIG. 5, when an object has been determined to be a foreign object in step S511, the wireless power transmitter enters a latch fault mode in step S513. However, when the object is not a foreign object in S511, the wireless power transmitter performs a joining procedure to possibly add the new wireless power receiver to the wireless charging network.

For example, referring again to FIG. 6, the wireless power transmitter may apply first powers 631 to 634 according to a first period. The wireless power transmitter may detect a change in an impedance while applying the first powers.

Referring again to FIG. 5, when the foreign object is removed from the charging area of the wireless power transmitter in step S515, i.e., the wireless power transmitter detects a change in impedance, the wireless power transmitter enters the power save mode in S517. However, when the foreign object is not removed from the charging area of the wireless power transmitter in S515-N, i.e., the wireless power transmitter does not detect the change in the impedance, the wireless power transmitter remains in the latch fault mode in step S513.

When the foreign substance has not been withdrawn, the wireless power transmitter may inform a user that the wireless power transmitter is currently in an error state through an indication, such as a lamp flicker and/or an alert sound.

For example, referring again to FIG. 6, after the foreign object is removed, the wireless power transmitter applies second powers 651 and 652, and third powers 661 to 665.

Additionally, the wireless power transmitter may have various other conditions for entering the latch fault mode. For example, when the wireless power transmitter is cross-connected to a wireless power receiver, the wireless power transmitter may also enter the latch fault mode. A cross-connection occurs when a wireless power receiver currently connected to another wireless power transmitter is joined in the wireless power network.

Figure 7:
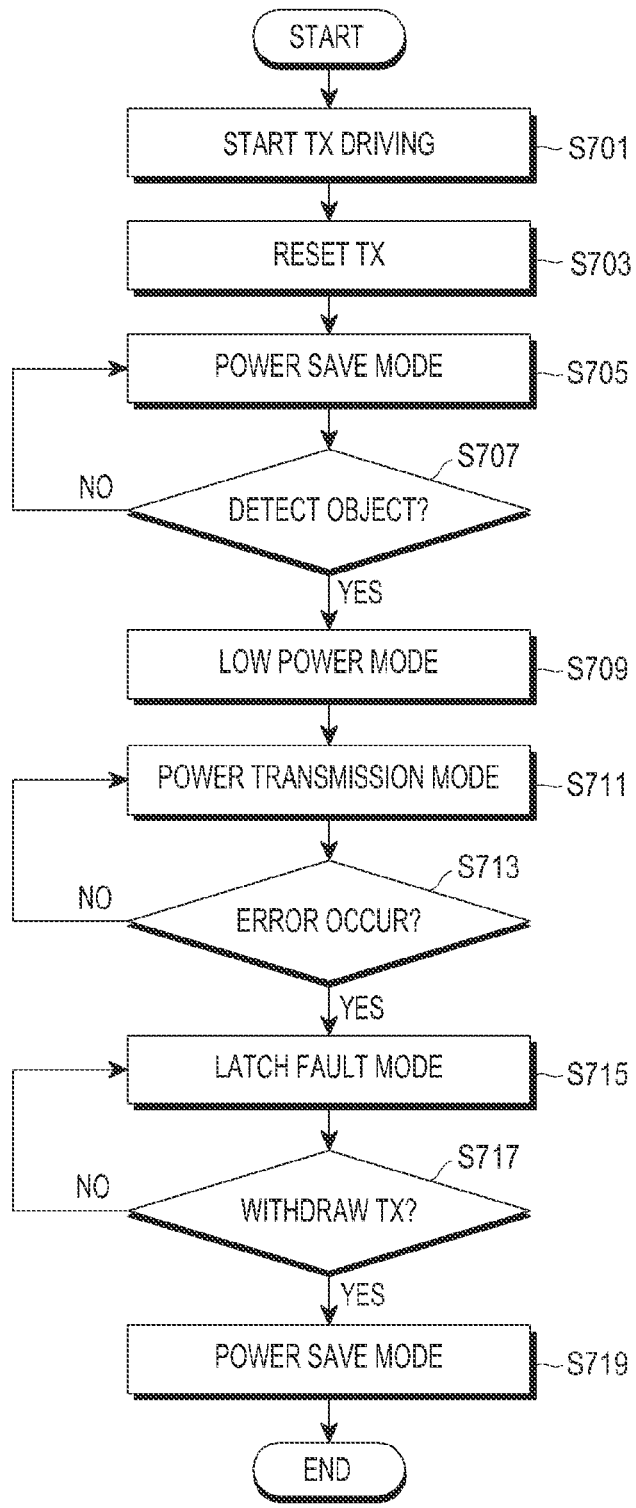
FIG. 7 is a flowchart illustrating a control method of a wireless power transmitter according to an embodiment of the present invention.

FIG. 7 is a flowchart illustrating a control method of a wireless power transmitter according to an embodiment of the present invention.

Referring to FIG. 7, the wireless power transmitter starts driving in step S701. In step S703, the wireless power transmitter resets an initial configuration. In step S705, the wireless power transmitter enters a power save mode. Again, during the power save mode, the wireless power transmitter applies different powers to a power transmission unit.

Figure 8:
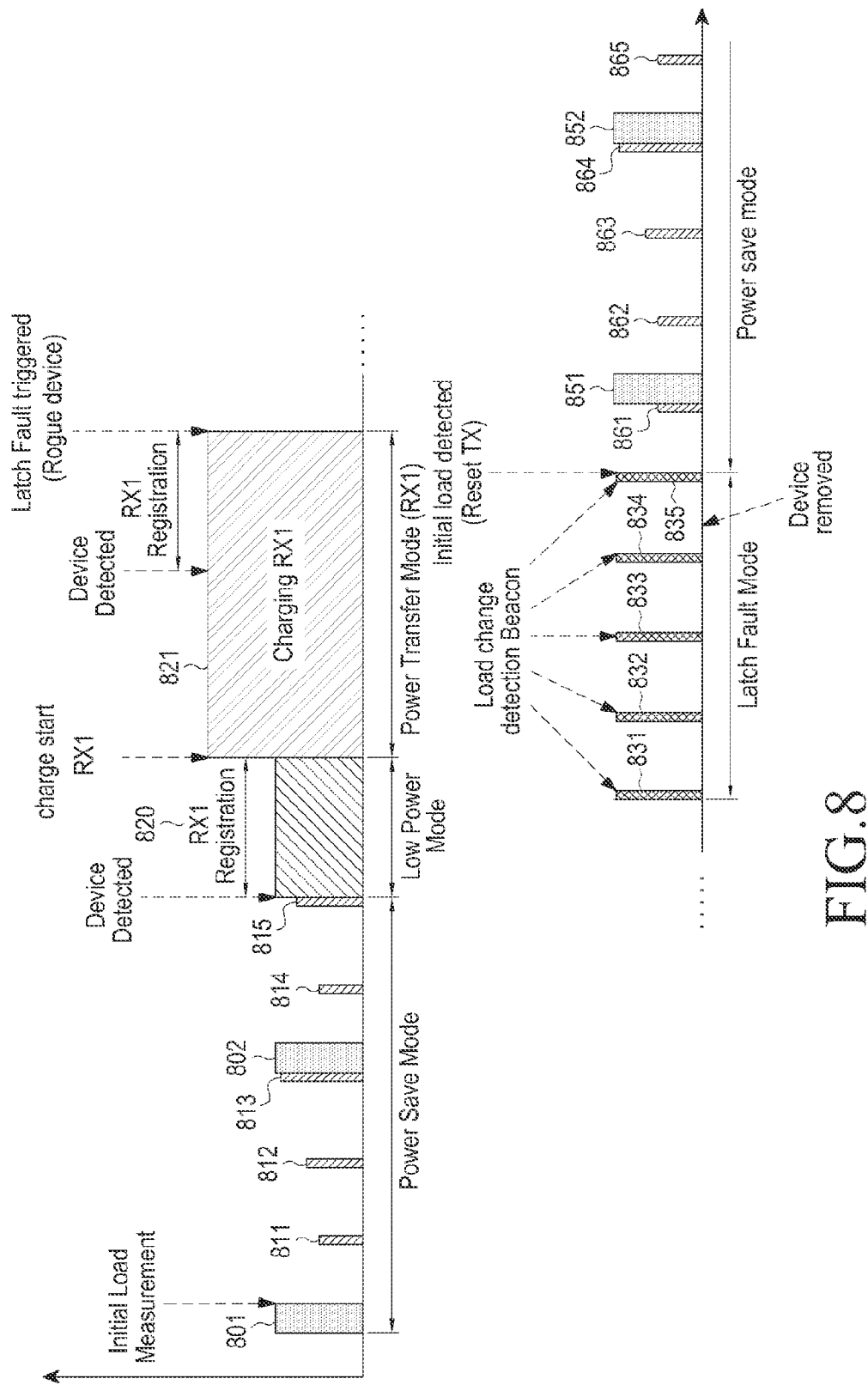
FIG. 8 is a graph illustrating power amounts applied by a wireless power transmitter over time according to an embodiment of the present invention.

FIG. 8 is a graph illustrating power amounts applied by a wireless power transmitter over time according to an embodiment of the present invention.

Referring to FIG. 8, during the power save mode, the wireless power transmitter applies second detection powers 801 and 802 and third detection powers 811, 812, 813, 814, and 815 to the power transmission unit. The wireless power transmitter applies the second detection powers 801 and 802 according to a second period, for a second period of time, and applies the third detection powers 811, 812, 813, 814, and 815 according to a third period, for a third period of time. Although the power values of the third detection powers 811, 812, 813, 814, and 815 illustrated in FIG. 8 are different from each other, they may also be the same.

The second detection powers 801 and 802 may be capable of driving the wireless power receiver, i.e., may be capable of driving a controller and a communication unit of the wireless power receiver.

The wireless power transmitter applies the second detection powers 801 and 802, and the third detection powers 811, 812, 813, 814, and 815 to a power reception unit according to a second period and a third period, respectively. When the wireless power receiver is placed in a charging area of the wireless power transmitter, impedance detected by the wireless power transmitter changes. The wireless power transmitter may detect a change in the impedance while the second detection powers 801 and 802, and the third detection powers 811, 812, 813, 814, and 815 are applied. For example, the wireless power transmitter may detect a change in the impedance while the third detection power 815 is applied.

Referring again to FIG. 7, the wireless power transmitter detects an object in step S707. When an object is not detected in step S707, the wireless power transmitter remains in the power save mode in step S705.

When the wireless power transmitter detects the object in step S707, i.e., when the impedance change is detected, the wireless power transmitter enters a low power mode in step S709. In the low power mode, the wireless power transmitter applies a driving power capable of driving the controller and the communication unit of the wireless power receiver.

For example, referring again to FIG. 8, the wireless power transmitter applies a driving power 820 to a power transmission unit. The wireless power receiver drives the controller and the communication unit through reception of the driving power 820. The wireless power receiver communicates with the wireless power transmitter using the driving power 820. For example, the wireless power receiver transmits and receives data for authentication, and joins a wireless power network managed by the wireless power transmitter, based on the data.

Referring again to FIG. 7, the wireless power transmitter enters a power transmission mode for transmitting a charging power in step S711. For example, the wireless power transmitter applies a charging power 821, as illustrated in FIG. 8, which is transmitted to the wireless power receiver.

The wireless power transmitter may determine in the power transmission mode whether or not an error occurs. For example, the error may be a foreign object placed in the charging area of the wireless power transmitter, a cross-connection, an over voltage, an over current, an over temperature, etc. Accordingly, the wireless power transmitter may include a sensing unit for measuring the over voltage, the over current, or the over temperature. For example, the wireless power transmitter may measure a voltage or a current of a reference point, and when the measured voltage or current exceeds a threshold value, determines that the over voltage condition or the over current condition has been satisfied.

Alternatively, the wireless power transmitter may include a temperature sensing unit, which measures a temperature of the reference point. When the temperature of the reference point exceeds a threshold value, the wireless power transmitter determines that the over temperature condition has been satisfied.

Although the error illustrated in FIG. 8 is a foreign object being placed in a charging area of the wireless power transmitter, it will be understood by those skilled in the art that the error is not limited thereto, and the wireless power transmitter operates through similar processes for other errors, e.g., the cross-connection, the over voltage, the over current, and the over temperature.

Referring again to FIG. 7, when an error does not occur in step S713, the wireless power transmitter remains in the power transmission mode in step S711. However, when an error occurs in step S713, the wireless power transmitter enters a latch fault mode in step S715. For example, the wireless power transmitter applies first powers 831 to 835, as illustrated in FIG. 8. Further, the wireless power transmitter output an error indication of the latch fault mode.

When it is determined that the foreign object or the wireless power receiver has not been withdrawn, the wireless power transmitter remains in the latch fault mode in step S715. However, when it is determined that the foreign substance or the wireless power receiver has been withdrawn, the wireless power transmitter enters the power save mode in step S719. For example, the wireless power transmitter applies second powers 851 and 851, and third powers 861 to 865, as illustrated in FIG. 8.

Figure 9:
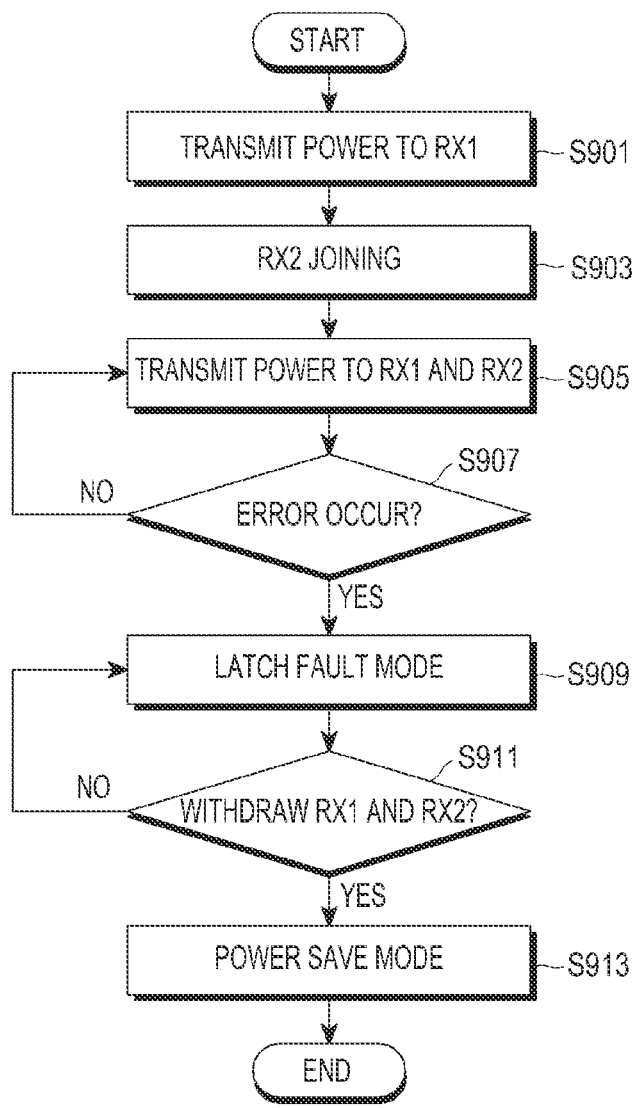
FIG. 9 is a flowchart illustrating a control method of a wireless power transmitter according to an embodiment of the present invention.

FIG. 9 is a flowchart illustrating a control method of a wireless power transmitter according to an embodiment of the present invention.

Referring to FIG. 9, the wireless power transmitter transmits a charging power to a first wireless power receiver in step S901. In step 903, the wireless power transmitter joins a second wireless power receiver into a wireless power network managed by the wireless power transmitter. In step S905, the wireless power transmitter transmits charging power to both the first wireless power receiver and the second wireless power receiver. More specifically, the wireless power transmitter applies a total sum of the charging powers that the first wireless power receiver and the second wireless power receiver require.

Figure 10:
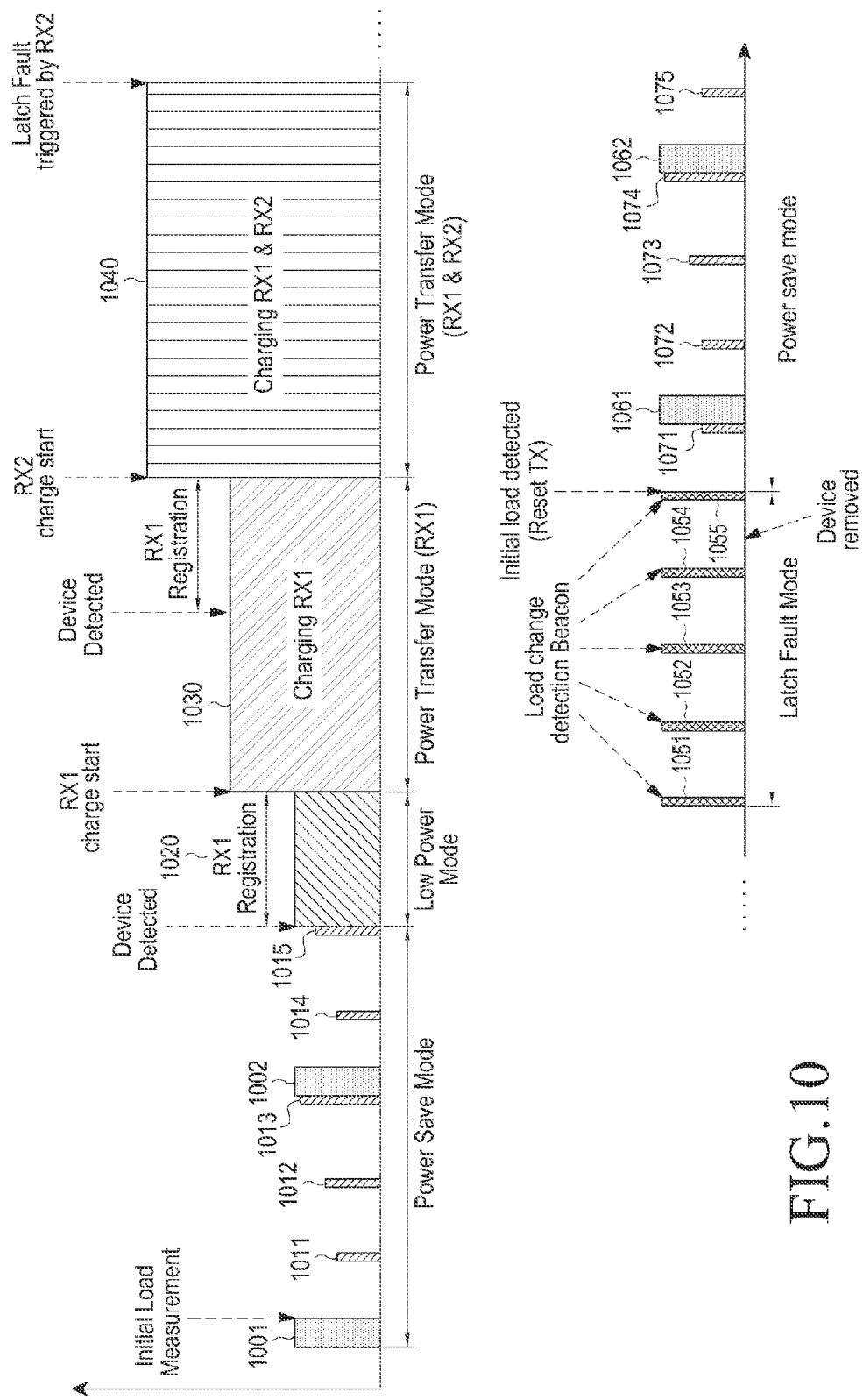
FIG. 10 is a graph illustrating power amounts applied by a wireless power transmitter over time according to an embodiment of the present invention.

FIG. 10 is a graph illustrating power amounts applied by a wireless power transmitter over time according to an embodiment of the present invention. Specifically, FIG. 10 illustrates an embodiment for steps S901 to S905 in FIG. 9.

Referring to FIG. 10, the wireless power transmitter remains in a power save mode for applying second detection powers 1001 and 1002, and third detection powers 1011 to 1015. The wireless power transmitter detects a first wireless power receiver, and enters a lower power mode for maintaining a detection power 1020. Thereafter, the wireless power transmitter enters a power transmission mode for applying a first charging power 1030. The wireless power transmitter then detects a second wireless power receiver, and joins the second wireless power receiver to the wireless power network. Thereafter, the wireless power transmitter applies a second charging power 1040 corresponding to a total sum of the charging powers required by the first wireless power receiver and the second wireless power receiver.

Referring again to FIG. 9, the wireless power transmitter may detect an error occurrence in step S907. For example, the error may be a foreign object placed in a charging area of the wireless power transmitter, a cross-connection, an over voltage, an over current, or an over temperature as described above. When the error does not occur in step S907, the wireless power transmitter maintains the second charging power 1040, as illustrated in FIG. 10.

When an error occurs in step S907, the wireless power transmitter enters a latch fault mode in step S909. For example, the wireless power transmitter applies first powers 1051 to 1055, as illustrated in FIG. 10, according to a first period.

Thereafter, wireless power transmitter determines whether or not both the first wireless power receiver and the second wireless power receiver have been withdrawn in step S911. For example, the wireless power transmitter may detect a change in an impedance while the first powers 1051 to 1055 are applied. The wireless power transmitter determines whether or not both the first wireless power receiver and the second wireless power receiver are withdrawn, based on whether the impedance returns to an initial numerical value.

When it is determined that both the first wireless power receiver and the second wireless power receiver have been withdrawn in step S911, the wireless power transmitter enters the power save mode in step S913. For example, the wireless power transmitter applies second detection powers 1061 and 1062, and third detection powers 1071 to 1075 according to a second period and a third period, respectively, as illustrated in FIG. 10.

When it is determined that both the first wireless power receiver and the second wireless power receiver have not been withdrawn in step S911, the wireless power transmitter maintains the latch fault mode in step S909.

As described above, even when applying the charging powers to a plurality of wireless power receivers, the wireless power transmitter may easily determine whether or not the wireless power receivers or the foreign object are withdrawn, when an error occurs.

Figure 11:
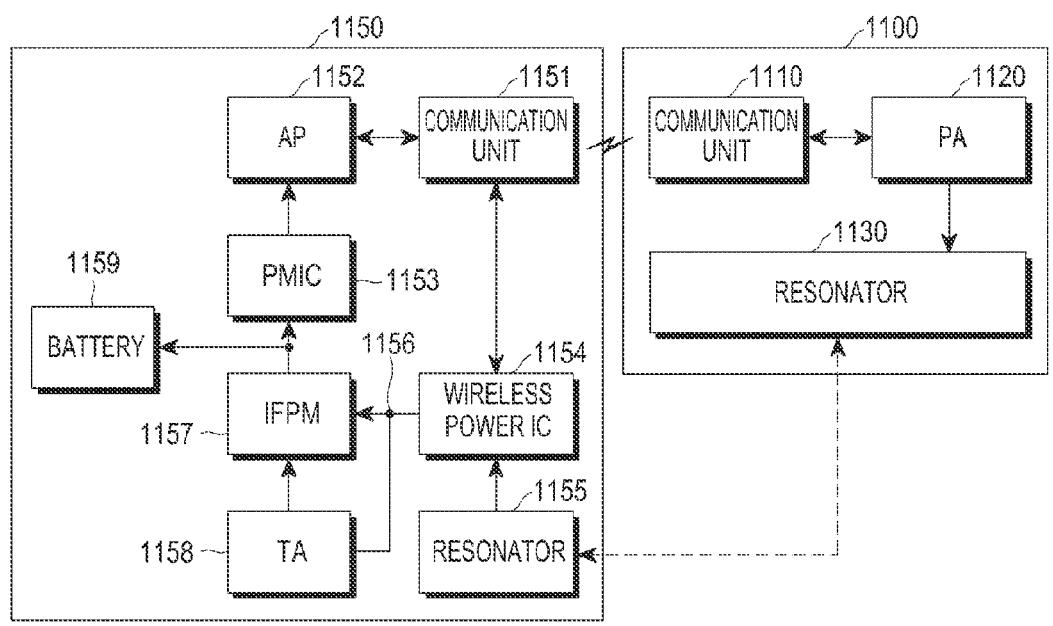
FIG. 11 is a block diagram illustrating a wireless power transmitter and a wireless power receiver according to an embodiment of the present invention.

FIG. 11 is a block diagram illustrating a wireless power transmitter and a wireless power receiver according to an embodiment of the present invention.

Referring to FIG. 11, the wireless power transmitter 1100 includes a communication unit 1110, a power amplifier 1120, and a resonator 1130. The wireless power receiver 1150 includes a communication unit 1151, an Application Processor (AP) 1152, a Power Management Integrated Circuit (PMIC) 1153, a wireless power Integrated Circuit (wireless power IC) 1154, a resonator 1155, an InterFace Power Management (IFPM) IC 1157, a TA 1158, and a battery 159.

The communication unit 1100 communicates with the communication unit 1151, for example, using BLE. The communication unit 1151 of the wireless power receiver 1150 transmits a PRU Dynamic signal having the data structure of Table 3 to the communication unit 1110 of the wireless power transmitter 1100. As described above, the PRU Dynamic signal may include at least one of voltage information, current information, temperature information, and alert information of the wireless power receiver 1150.

An output power value from the power amplifier 1120 is adjusted based on the received PRU Dynamic signal. For example, when an over voltage, an over current, and an over temperature are applied to the wireless power receiver 1150, the power value output from the power amplifier 1120 may be decreased. Further, when a voltage and a current of the wireless power receiver 1150 is less than a predetermined value, the power value output from the power amplifier 1120 may be increased.

A charging power from the resonator 1130 is transmitted to the resonator 1155.

The wireless power integrated circuit 1154 rectifies and DC-DC converts the charging power received from the resonator 1155. The wireless power IC 1154 allows driving of the communication unit 1151 or charging of the battery 1159 by using the converted power.

A wired charging terminal may be inserted in the travel adapter 1158. The wired charging terminal, such as a 30-pin connector or a Universal Serial Bus (USB) connector, may be inserted in the travel adapter 1158, which charges the battery 1159 using power supplied from an external power source.

The IFPM integrated circuit 1157 processes and outputs a power applied from the wired charging terminal to the battery 1159 and the PMIC 1153.

The PMIC 1153 manages wirelessly received power or power received via a wire, and power applied to the respective elements of the wireless power receiver 1150. The AP 1152 receives power information from the PMIC 1153, and controls the communication unit 1151 to transmit the PRU Dynamic signal for reporting this.

The TA 1158 may be connected to a node 1156, which is connected to the wireless power IC 1154. When a travel connector is inserted in the TA 1158, a predetermined voltage, e.g., 5V, may be applied to the node 1156. The wireless power IC 1154 determines whether or not the travel connector has been inserted in the TA 1158, through monitoring the voltage applied to the node 1156.

Figure 12:
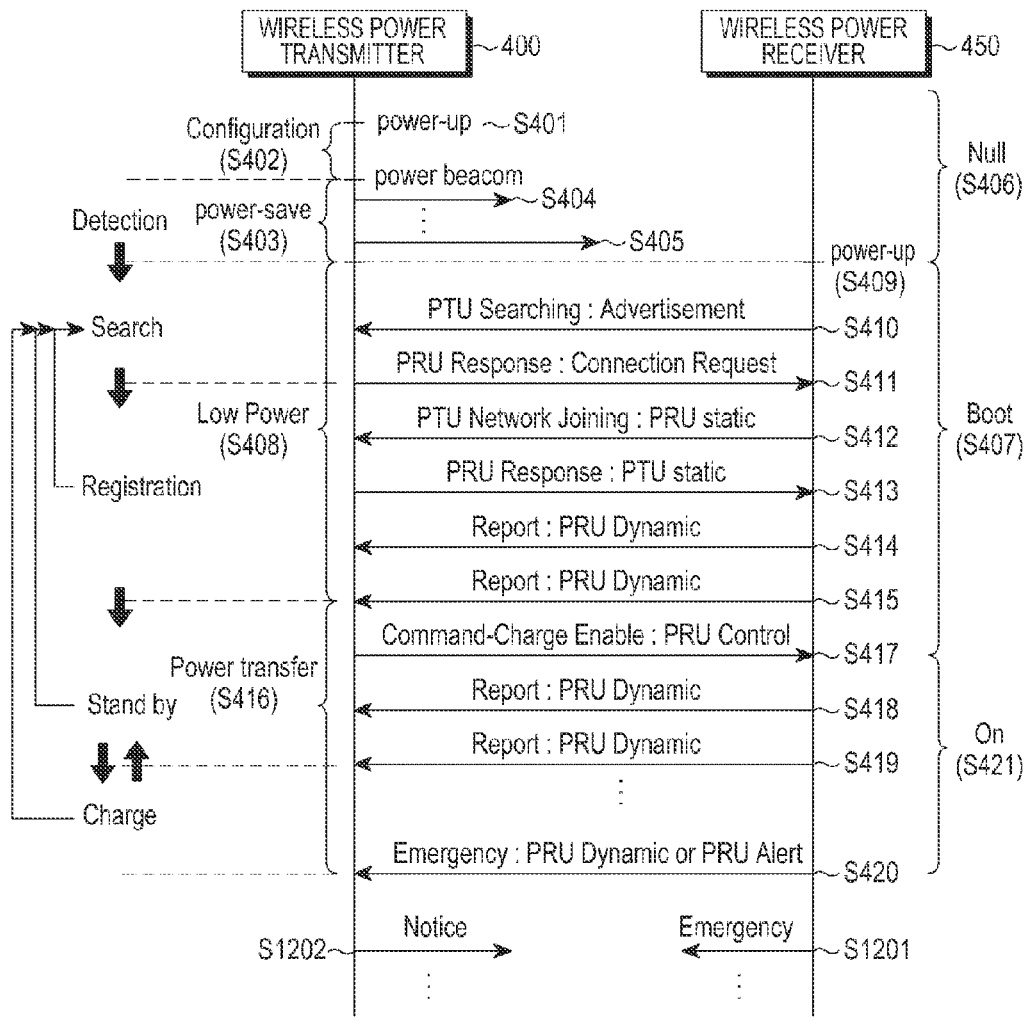
FIG. 12 is a signal flow diagram illustrating a method of transmitting emergency situation information in a wireless charging network according to an embodiment of the present invention.

FIG. 12 is a flow diagram illustrating a method of transmitting emergency situation information in a wireless charging system, according to an embodiment of the present invention. Because steps S401 to S421 have already been described above for FIG. 4, a repetitive description of these steps will be omitted here.

Referring to FIG. 12, when an emergency situation occurs in the wireless power receiver 450, the wireless power receiver 450 transmits a packet including emergency situation information to the wireless power transmitter 400 in step S1201, and may enter an initial mode according to an embodiment of the present invention. The initial mode state may be, for example, a load switch off state.

The wireless power transmitter 400 receives and processes the packet including the emergency situation information, and then stops the wireless power transmission.

Additionally, the wireless power transmitter 400 may transmit the emergency situation information to other wireless power receivers in the network managed by the wireless power transmitter in step S1202, and may enter the system in a reset mode (a switch off state).

If a communication link is continued, a connection can be continuously maintained. Further, when the wireless power transmitter 400 has attempted to power off and reset, the wireless power receiver 450 may set a new communication link from the wireless power transmitter.

According to an embodiment of the present invention, the emergency situation information may include an over current situation (OCP), an over voltage situation (OVP), and an over temperature situation (OTP).

When the emergency situations (e.g., OCP, OVP, or OTP) occur, the wireless power transmitter 400 powers off a power module, and enters a transmission fault (Tx fault) mode according to an embodiment of the present invention.

An example of a format of a signal (message) frame for transmitting a packet including an emergency situation is shown below in Table 5.

In Table 5, a network ID refers to an address of a wireless power transmitter network in which the wireless power receiver has joined, a session ID refers to an address of the wireless power receiver, and an emergency situation refers to a situation that has occurred in the wireless power receiver.

TABLE 5

| | Frame Type | Sequence Number | Network ID | Emergency Case | Session ID |
|---|---|---|---|---|---|
| Octets | 1 | 1 | 1 | 1 | 1 |

An example of the Emergency Case in Table 5 is shown below in Table 6.

TABLE 6

| Emergency Case | |
|---|---|
| Value b7-b0 | Description |
| 0000 0000 | Reserved |
| 0000 0001 | Over voltage occurred |
| 0000 0010 | Over current occurred |
| 0000 0011 | Over temperature occurred |
| 0000 0100 | Rogue device detected |
| 0000 0101-1111 1111 | Reserved |

An example of a BLE profile is shown in Table 7 below. A PRU Dynamic parameter including a PRU alert field may be transferred to the wireless power transmitter. The PRU Dynamic signal may be transmitted without a request of the wireless power transmitter.

TABLE 7

| Field | Octets | Description | Use? | Units |
|---|---|---|---|---|
| Optional fields | 1 | Defines which optional fields are populated | Mandatory | |
| VRECT | 2 | Voltage at diode output | Mandatory | mV |
| IREG | 2 | Current at diode output | Mandatory | mV |
| VOUT | 2 | Voltage at charge/battery port | Optional | mV |
| IOUT | 2 | Current at charge/battery port | Optional | mA |
| Temperature | 1 | Temperature of PRU | Optional | Deg C. from −40 C. |
| VRECT_MIN_DYN | 2 | Minimum VRECT (dynamic value) | Optional** | mV |
| VRECT_MAX_DYN | 2 | Maximum VRECT (dynamic value) | Optional** | mV |
| PRU alert | 1 | Warnings | Mandatory * | Bit field |
| RFU | 5 | Undefined | | |

An example of a detailed bit field for configuration of the PRU alert signal in Table 7 is shown below in Table 8.

TABLE 8

| 7 | 6 | 5 | 4 | 3 | 2 | 1 | 0 |
|---|---|---|---|---|---|---|---|
| Over voltage | Over current | Over temperature | Charge complete | RFU | RFU | RFU | RFU |

Accordingly, when the emergency situation occurs in the wireless power receiver, the wireless power receiver may efficiently transmit the emergency situation information to the wireless power transmitter according to the embodiment of the present invention. For example, the wireless power receiver may also insert the emergency situation information into a specific field of the PRU Dynamic signal, which is periodically transmitted to the wireless power transmitter, and may also generate and transmit a separate PRU emergency signal to the wireless power transmitter in real time.

Figure 13:
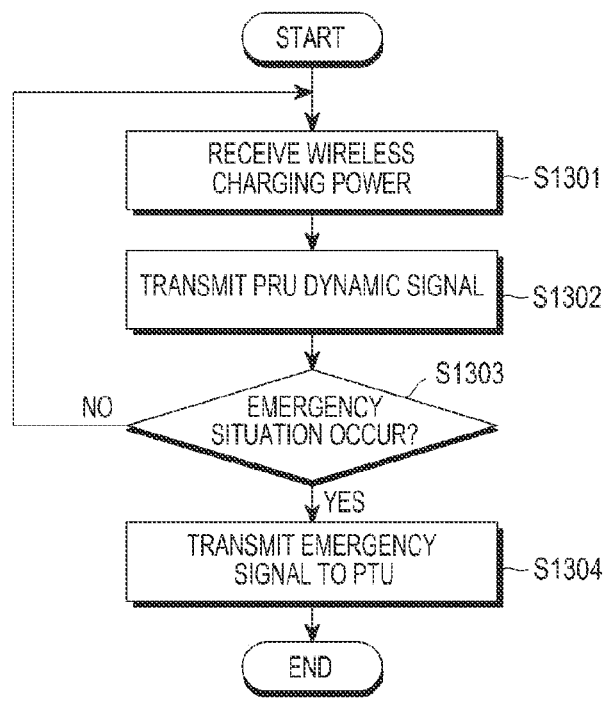
FIG. 13 is a flowchart illustrating an emergency information transmission procedure of a wireless power receiver according to an embodiment of the present invention.

FIG. 13 is a flowchart illustrating an emergency information transmission procedure of a wireless power receiver (PRU) according to an embodiment of the present invention.

Referring to FIG. 13, the wireless power receiver (PRU) receives a wireless charging power from a wireless power transmitter (PTU) in step S1301, and transmits a PRU Dynamic signal to the PTU according to a predetermined period in step S1302.

When an emergency situation, such as an over voltage, an over current, an over temperature, etc., or a system error occurs in the PRU in step S1303, the PRU transmits an emergency signal to the PTU according to an embodiment of the present invention in step S1304. Accordingly, when the emergency situation occurs, the PRU may rapidly transmit the emergency information to the PTU, without waiting for a next PRU Dynamic signal.

Figure 14:
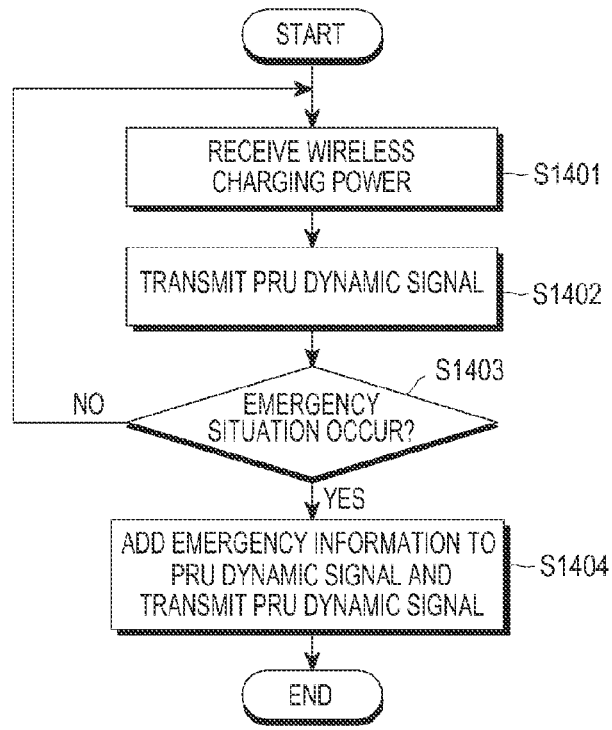
FIG. 14 is a flowchart illustrating an emergency information transmission procedure of a wireless power receiver according to an embodiment of the present invention.

FIG. 14 is a flowchart illustrating an emergency information transmission procedure of a wireless power receiver according to an embodiment of the present invention.

Referring to FIG. 14, a PRU receives a wireless charging power from a wireless power transmitter (PTU) in step S1401, and transmits a PRU Dynamic signal to the PTU according to a predetermined period in step S1402.

When an emergency situation or a system error occurs in the PRU in step S1403, the PRU adds emergency information to the PRU Dynamic signal to transmit that to the PTU according to an embodiment of the present invention (S1404). That is, when the emergency situation occurs, the PRU adds the emergency information to a specific data field in the PRU Dynamic signal, and transmits the PRU Dynamic signal to the PTU. Accordingly, the PRU efficiently transmits the emergency information to the PTU though the PRU Dynamic signal, without any additional signaling.

Figure 15:
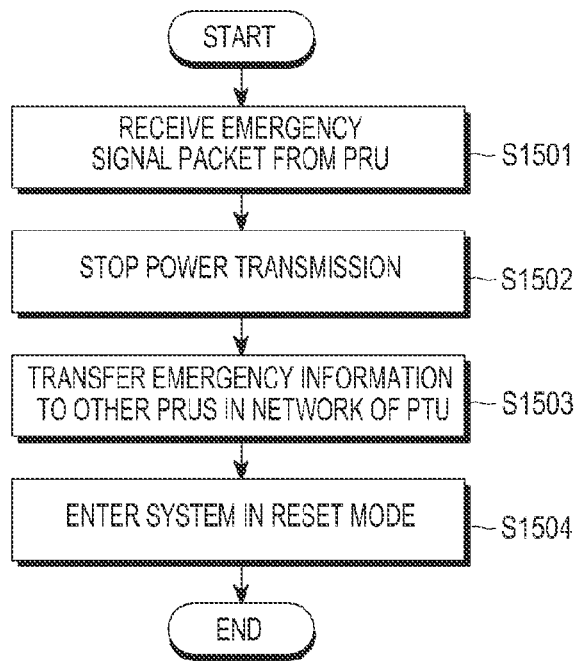
FIG. 15 is a flowchart illustrating an emergency information processing procedure of a wireless power transmitter according to an embodiment of the present invention.

FIG. 15 is a flowchart illustrating an emergency information processing procedure of a wireless power transmitter according to an embodiment of the present invention.

Referring to FIG. 15, when the PTU receives an emergency signal packet from a PRU in step S1501, the PTU stops the wireless power transmission to the PRU in step S1502, and transmits the received emergency information to other PRUs included in the wireless network in step S1503. In step S1504, a system of the PTU is entered in a reset mode.

Figure 16:
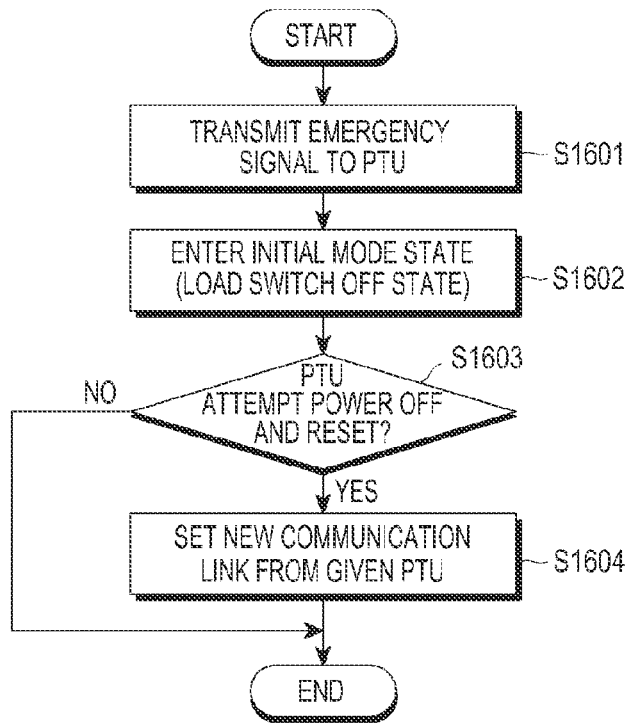
FIG. 16 is a flowchart illustrating a processing procedure of a wireless power receiver during an emergency situation, according to an embodiment of the present invention.

FIG. 16 is a flowchart illustrating a processing procedure of a wireless power receiver during an emergency situation, according to an embodiment of the present invention.

Referring to FIG. 16, the PRU transmits the emergency signal to the PTU in step S1601 and enters an initial mode state in step S1602. The initial mode state may be, for example, a load switch off state.

When the PTU supplying a wireless power to the PRU attempts to power off and reset after receiving the emergency information in step S1603, a new communication link from the PTU is set in step S1604. For example, the procedure illustrated in FIG. 4 may be performed.

Figure 17:
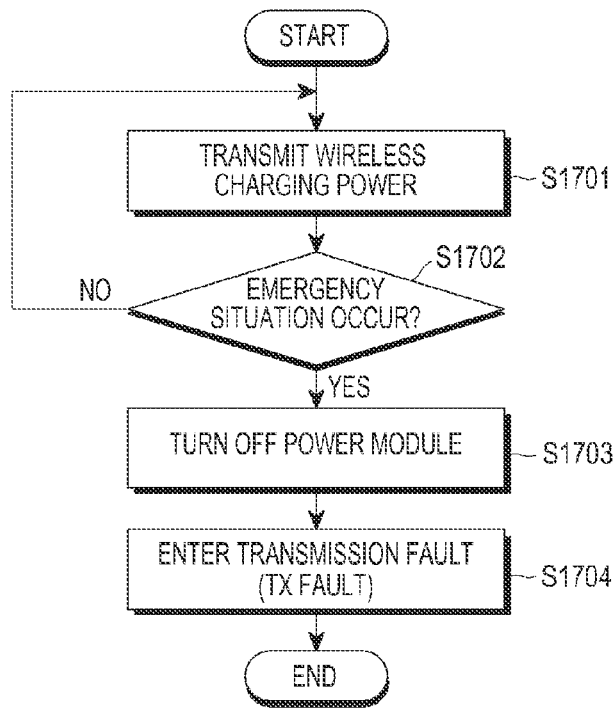
FIG. 17 is a flowchart illustrating an emergency information processing procedure of a wireless power transmitter according to an embodiment of the present invention.

FIG. 17 is a flowchart illustrating an emergency information processing procedure of a wireless power transmitter according to an embodiment of the present invention.

Referring to FIG. 17, a PTU transmits a wireless charging power to a PRU in step S1701. When an emergency situation occurs in the PTU in step S1702, the PTU turns off a power transmission module of the PTU in step S1703, and enters a transmission fault (Tx fault) state in step S1704.

Figure 18:
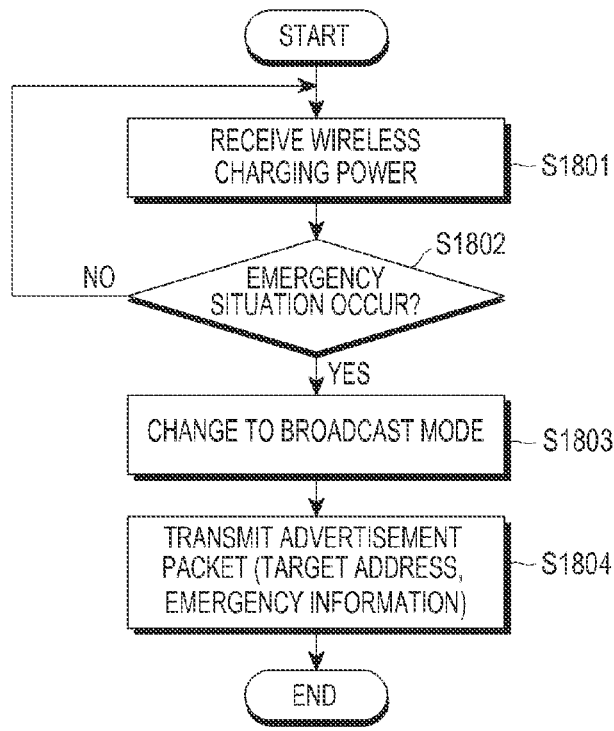
FIG. 18 is a flowchart illustrating an emergency information processing procedure of a wireless power transmitter according to an embodiment of the present invention.

FIG. 18 is a flowchart illustrating an emergency information processing procedure of a wireless power transmitter according to an embodiment of the present invention.

Referring to FIG. 18, a PRU receives a wireless charging power from a PTU in step S1801. When an emergency situation occurs during wireless charging (S1802), the PRU changes a peripheral mode to a broadcast mode in step S1803. In step S1804, the PRU transmits an Advertisement packet to other PRUs in a wireless charging network. In addition to performing one-to-one communication with the PTU, the PRU may transfer the emergency situation to other devices in the wireless charging network. For example, the Advertisement packet may include a target address, and emergency information.

Figure 19:
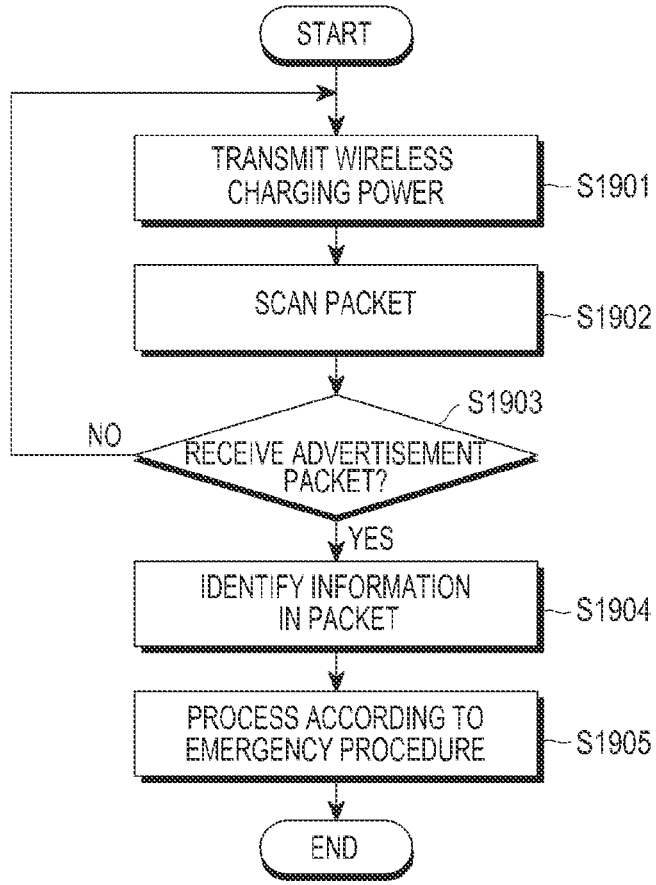
FIG. 19 is a flowchart illustrating an emergency information processing procedure of a wireless power transmitter according to an embodiment of the present invention.

FIG. 19 is a flowchart illustrating an emergency information processing procedure of a wireless power transmitter according to an embodiment of the present invention.

Referring to FIG. 19, a PTU transmits a wireless charging power to a PRU in step S1901, and scans a packet transmitted from the PRU in step S1902. The packet scanning may be performed according to a predetermined period, and may also be performed every time a specific event occurs.

When an Advertisement packet from a specific PTU is received, based on the packet scanning, in step S1903, information in the packet is identified in step S1904, and a preset processing is performed according to an emergency procedure in step S1905.

Figure 20:
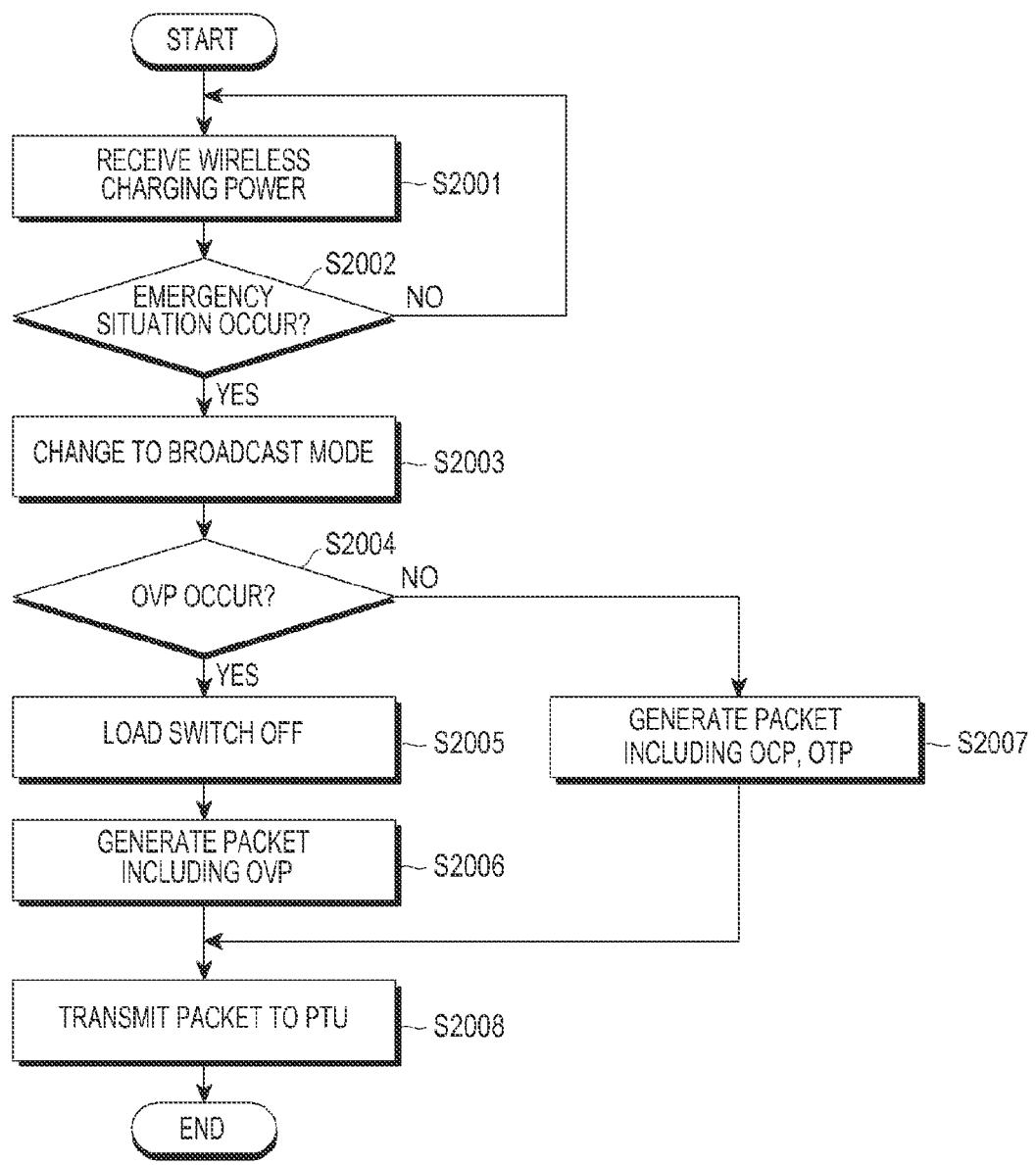
FIG. 20 is a flowchart illustrating a processing procedure of a wireless power receiver during an emergency situation, according to an embodiment of the present invention.

FIG. 20 is a flowchart illustrating a processing procedure of a wireless power receiver during an emergency situation, according to an embodiment of the present invention.

Referring to FIG. 20, a PRU receives a wireless charging power from a PTU in step S2001. When an emergency situation occurs in step S2002, the peripheral mode is changed to the broadcast mode in step S2003.

When it is determined that the emergency situation corresponds to an OVP in step S2004, the emergency situation is considered more dangerous than an emergency situation by an OCP or an OTP, and a load switch is turned off in step S2005 to stop the charging procedure. In step S2006, an emergency signal packet including the OVP is generated. In step S2008, the generated emergency signal packet is transmitted to the PTU.

However, when the emergency situation does not correspond to the OVP, but to the OCP or the OTP, which are considered less dangerous than the emergency situation by the OVP, the load switch is not turned off, and an emergency signal packet including the OCP and the OTP is generated in step S2007. In step S2008, the generated emergency signal packet is transmitted to the PTU.

Alternatively, the load switch off procedure in step S2005 and the packet transmission procedure in step S2008 may be executed in a different order than illustrated in FIG. 20.

Figure 21:
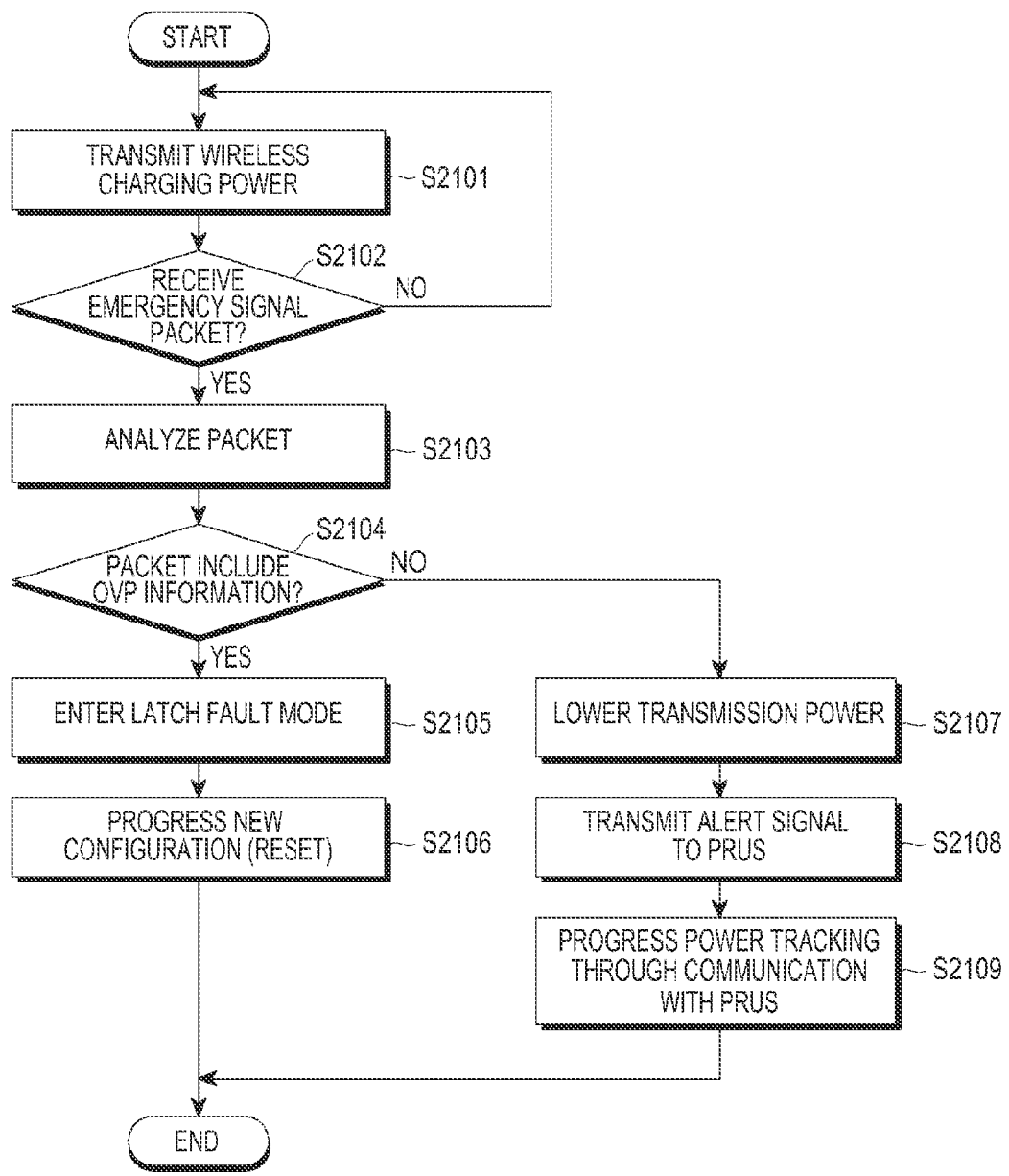
FIG. 21 is a flowchart illustrating a processing procedure of a wireless power transmitter during an emergency situation, according to an embodiment of the present invention.

FIG. 21 is a flowchart illustrating a processing procedure of a wireless power transmitter during an emergency situation, according to an embodiment of the present invention. Specifically, FIG. 21 illustrates a procedure of a PTU corresponding to the procedure of the PRU illustrated in FIG. 20.

Referring to FIG. 21, the PTU transmits a wireless charging power to the PRU in step S2101. When receiving an emergency signal packet from the PRU in step S2102, the PTU analyzes information included in the packet.

When it is determined that OVP information has been included in the packet in step S2104, a latch fault mode is immediately entered in step S2105, and a new configuration (reset) procedure is initiated in step S2106.

However, when it is determined that the OVP information has not been included in the packet in step S2104, and OCP information or OTP information has been included in the packet, the power transmission is maintained, and a level of the transmitted wireless charging power is lowered in step S2107. In step S2108, alert signals are transmitted to the PRUs included in a wireless charging network of the PTU. In step S2109, power tracking is performed through communication with the respective PRUs.

Alternatively, step S2107 and step S2108 may be executed in a different order than illustrated in FIG. 21.

Figure 22:
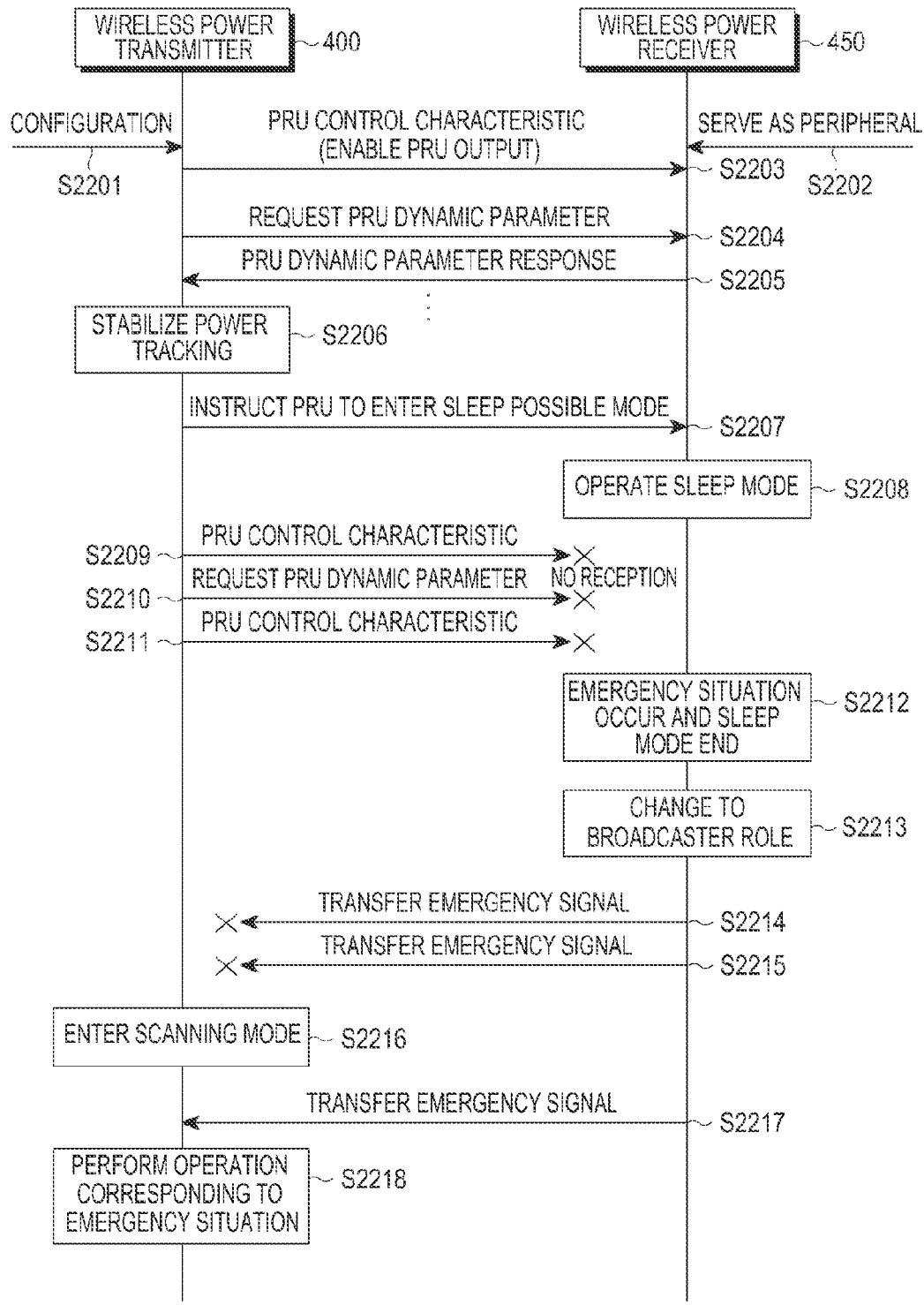
FIG. 22 is a signal flow diagram illustrating a method of transmitting and receiving a packet including emergency situation information in a wireless charging network according to an embodiment of the present invention.

FIG. 22 is a signal flow diagram illustrating a method for transmitting and receiving a packet including emergency situation information in a wireless charging network according to an embodiment of the present invention.

When an emergency situation occurs while a wireless power transmission procedure is progressed according to the procedure having been described above with reference to FIG. 4, a wireless power receiver immediately changes a role thereof from a peripheral mode to a broadcasting mode. An advertisement packet may be transferred in the broadcasting mode, and an advertisement channel may use channel numbers 38, 38, and 39.

For example, advertisement data may include a target address and emergency information, and may designate a target as a wireless power transmitter. The advertisement data may include an over current, an over voltage, and an over temperature of the wireless power receiver as emergency situation information. The wireless power transmitter periodically or aperiodically serves as a scanner to acquire an advertisement packet from the wireless power receiver, and performs an operation for processing the emergency situation.

When an emergency situation occurs, in accordance with another embodiment of the present invention, the wireless power receiver changes the role thereof to the peripheral mode or the broadcasting mode, and then generates and transmits a packet including emergency situation information (e.g., OVP, OCP, and OTP) to the power transmitter. The wireless power receiver turns off a load switch thereof, and generates and transmits a packet including an emergency message (OVP) to the wireless power transmitter. After receiving the emergency message, the wireless power transmitter may enter a latch mode, and may newly perform a configuration (reset).

When an emergency situation of the OCP or the OTP occurs in the wireless power receiver, the wireless power receiver generates and transmits the packet including the emergency message (OCP or OTP) to the wireless power transmitter, and then reduces the power. The power is reduced as low as a communication link with the wireless power receiver in which the emergency situation has occurred may be at least maintained, and for example, the power may be configured between I_TX_Beacon_Min and I_TX_Beacon_Max.

The wireless power transmitter transmits an emergency message (a state of the power receiver) to the wireless power receivers, and the respective wireless power receivers perform power tracking through communication.

Referring to FIG. 22, after a configuration for a wireless charging network in the wireless power transmitter 400 in step S2201, the wireless power transmitter 400 transmits a PRU control signal to the wireless power receiver 450 in step S2203. In step S2202, the wireless power receiver 450 operates in a peripheral mode. The wireless power transmitter 400 requests a PRU Dynamic parameter from the wireless power receiver 450 in step S2204, and the wireless power receiver 450 transmits a PRU Dynamic parameter response in response to the request in step S2205.

When the power tracking is stabilized during wireless power transmission in the wireless power transmitter 400 in step S2206, the wireless power transmitter 400 instructs the corresponding wireless power receiver to enter a sleep possible mode in step S2207. Accordingly, the corresponding wireless power receiver 450 operates in the sleep mode in step S2208.

The wireless power transmitter 400 transmits the PRU control signal and the PRU Dynamic signal request to the wireless power receiver 450 in steps S2209, S2210, and S2211 However, as illustrated in FIG. 22, the wireless power receiver 450 does not receive the signals transmitted from the wireless power transmitter 400. Therefore, the wireless power receiver 450 determines that an emergency situation has occurred and terminates the sleep mode in step S2212. In step S2213, the wireless power receiver 450 shifts from the peripheral mode to a broadcast mode.

In steps S2214 and S2215, the wireless power receiver 450 begins to transfer the emergency signal to the wireless power transmitter 400 according to the embodiment of the present invention. When the wireless power transmitter 400 enters a scanning mode to scan a packet in step S2216, the wireless power transmitter 400 receives the emergency signal transmitted from the wireless power receiver 450 in step S2217. The wireless power transmitter having received the emergency signal performs an operation corresponding to the above-described emergency situation in step S2218.

According to the above-described embodiments of the present invention, when an emergency situation occurs in a wireless power receiver of a wireless charging network, the wireless power receiver transmits the emergency information separate from a general message exchanging procedure between the wireless power receiver and the wireless power transmitter, which makes it possible to rapidly and efficiently cope with the emergency situation.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A control method of a wireless power receiver, the method comprising:
   transmitting an advertisement signal to search for a wireless power transmitter;
   receiving, from the wireless power transmitter, a connection request signal to form a connection between the wireless power receiver and the wireless power transmitter, wherein the connection request signal corresponds to the advertisement signal;
   receiving charging power from the wireless power transmitter;
   detecting an error state;
   generating an alert signal indicating the error state; and
   transmitting the alert signal to the wireless power transmitter,
   wherein the error state includes at least one of an over-voltage state in which a rectifier voltage of the wireless power receiver is higher than a reference voltage, an over-current state in which a rectifier current of the wireless power receiver is higher than a reference current, an over-temperature state in which a temperature of the wireless power receiver is higher than a reference temperature, and a system error of the wireless power receiver.

2. The method of claim 1, further comprising entering an initial mode state after transmitting the alert signal.

3. The method of claim 1, further comprising setting a new communication link with the wireless power transmitter, after transmitting the alert signal, when the wireless power transmitter attempts to power off.

4. The method of claim 1, further comprising:
   changing to a broadcast mode after transmitting the alert signal; and
   transmitting an advertisement packet including a target address and the information of the error state.

5. A control method of a wireless power transmitter, the method comprising:
   receiving an advertisement signal from a wireless power receiver;
   transmitting, to the wireless power receiver, a connection request signal to form a connection between the wireless power receiver and the wireless power transmitter, wherein the connection request signal corresponds to the advertisement signal;
   transmitting charging power to the wireless power receiver;
   receiving an alert signal from the wireless power receiver; and
   controlling the transmitting of the charging power, corresponding to the received alert signal,
   wherein the alert signal indicates an error state of the wireless power receiver,
   the error state of the wireless power receive includes at least one of an over-voltage state in which a rectifier voltage of the wireless power receiver is higher than a reference voltage, an over-current state in which a rectifier current of the wireless power receiver is higher than a reference current, and an over-temperature state in which a temperature of the first wireless power receiver is higher than a reference temperature.

6. The method of claim 5, further comprising entering a reset mode.

7. The method of claim 5, further comprising:
   turning off a power module of the wireless power transmitter; and
   entering a transmission error mode.

8. The method of claim 5, further comprising entering a latch fault mode when over voltage information is included in the alert signal.

9. The method of claim 5, further comprising lowering a transmission power of the wireless power transmitter when over voltage information is not included in the alert signal.

10. A wireless power receiver, comprising:
   a communication unit configured to:
      transmit an advertisement signal to search for a wireless power transmitter, and
      receive, from the wireless power transmitter, a connection request signal to form a connection between the wireless power receiver and the wireless power transmitter, wherein the connection request signal corresponds to the advertisement signal;
   a power reception unit configured to receive charging power from the wireless power transmitter;
   a controller configured to detect an error state, and generate an alert signal indicating the error state; and
   wherein the communication unit is further configured to transmit the alert signal to the wireless power transmitter,
   wherein the error state includes at least one of an over-voltage state in which a rectifier voltage of the wireless power receiver is higher than a reference voltage, an over-current state in which a rectifier current of the wireless power receiver is higher than a reference current, an over-temperature state in which a temperature of the wireless power receiver is higher than a reference temperature, and a system error of the wireless power receiver.

11. The wireless power receiver of claim 10, wherein the controller enters an initial mode state after the alert signal is transmitted.

12. The wireless power receiver of claim 10, wherein the controller controls sets a new communication link with the wireless power transmitter, after the alert signal is transmitted, when the wireless power transmitter attempts to power off.

13. The wireless power receiver of claim 10, wherein the controller changes to a broadcast mode, after the alert is transmitted, and
wherein the communication unit transmits an advertisement packet including a target address and the information of the error state.

14. A wireless power transmitter, comprising:
a power transmission unit configured to transmit charging power to a wireless power receiver of a wireless charging network;
a communication unit configured to receive alert signal from the wireless power receiver; and
a controller configured to receive an advertisement signal from the wireless power receiver and transmit, to the wireless power receiver, a connection request signal to form a connection between the wireless power receiver and the wireless power transmitter, wherein the connection request signal corresponds to the advertisement signal, and control the transmitting of the charging power, corresponding to the received alert signal,
wherein the alert signal indicates an error state of the wireless power receiver,
the error state of the first wireless power receive includes at least one of an over-voltage state in which a rectifier voltage of the first wireless power receiver is higher than a reference voltage, an over-current state in which a rectifier current of the first wireless power receiver is higher than a reference current, and an over-temperature state in which a temperature of the first wireless power receiver is higher than a reference temperature.

15. The wireless power transmitter of claim 14, wherein the controller enters into a latch fault mode, when over voltage information is included in the alert signal.

16. The wireless power transmitter of claim 14, wherein the controller lowers a transmission power of the power transmission unit, when over voltage information is not included in the alert signal.

17. The method of claim 5, further comprising:
transmitting the alert signal to a second wireless power receiver of the wireless charging network.

18. The wireless power transmitter of claim 14, wherein the controller transfers the alert signal to a second wireless power receiver of the wireless charging network.

* * * * *